United States Patent [19]
Herpst

[11] Patent Number: 5,898,522
[45] Date of Patent: Apr. 27, 1999

[54] PROTECTIVE WINDOW ASSEMBLY AND METHOD OF USING THE SAME FOR A LASER BEAM GENERATING APPARATUS

[76] Inventor: Robert D. Herpst, 11 Trotters La., Mahwah, N.J. 07430

[21] Appl. No.: 08/880,663

[22] Filed: Jun. 23, 1997

Related U.S. Application Data

[63] Continuation-in-part of application No. 08/668,384, Jun. 21, 1996, abandoned, which is a continuation-in-part of application No. 08/540,561, Oct. 6, 1995, abandoned
[60] Provisional application No. 60/038,007, Feb. 14, 1997.
[51] Int. Cl.⁶ .............................. G03B 11/04; G02B 7/02
[52] U.S. Cl. .......................... 359/511; 359/509; 359/819
[58] Field of Search .................. 359/507–511, 808–811, 359/819, 827, 894; 372/109, 101, 58, 61, 98

[56] References Cited

U.S. PATENT DOCUMENTS

| | | |
|---|---|---|
| 2,953,970 | 9/1960 | Maynard .................................. 359/827 |
| 3,131,477 | 5/1964 | Thomas .................................... 359/511 |
| 3,569,660 | 3/1971 | Houldcroft ............................... 359/509 |
| 3,604,890 | 9/1971 | Mullaney et al. ....................... 359/509 |
| 3,696,230 | 10/1972 | Friedrich ................................ 359/509 |
| 4,240,691 | 12/1980 | Holmqvist et al. ..................... 359/509 |
| 4,415,235 | 11/1983 | Coates .................................... 359/819 |
| 4,592,353 | 6/1986 | Daikuzono ................................ 606/16 |
| 5,239,552 | 8/1993 | Okuyama et al. ...................... 372/109 |
| 5,299,067 | 3/1994 | Kutz et al. .............................. 359/827 |
| 5,311,358 | 5/1994 | Pederson et al. ....................... 359/511 |
| 5,312,397 | 5/1994 | Cosmescu ................................ 600/14 |
| 5,448,587 | 9/1995 | Huang .................................... 372/107 |

*Primary Examiner*—Thong Nguyen
*Attorney, Agent, or Firm*—Watov & Kipnes, P.C.

[57] ABSTRACT

A protective window assembly and its use with a focusing assembly lens in a laser beam generating apparatus, the protective window assembly contains a window to protect the focusing lens against contamination and the like.

15 Claims, 22 Drawing Sheets

PROTECTIVE WINDOW ASSEMBLY AND METHOD OF USING THE SAME FOR A LASER BEAM GENERATING APPARATUS

RELATED APPLICATION

This is a Continuation-In-Part Application of U.S. Ser. No. 08/668,384 filed Jun. 21, 1996 which is a Continuation-In-Part Application of U.S. Ser. No.08/540,561 filed Oct. 6, 1995, both abandoned. This is also a Continuation Application of Provisional Patent Application Ser. No. 60/038,007 filed Feb. 14, 1997.

FIELD OF THE INVENTION

The present invention is directed to a protective window assembly for use in conjunction with or integral with a focusing lens assembly in a laser beam generating apparatus in which a protective window is provided for protecting the focusing lens and especially any lens coating thereon against contamination. The protective window is situated within a single housing containing the focusing lens or in a separate housing which is operatively secured to an assembly containing the focusing lens.

BACKGROUND OF THE INVENTION

Lasers are a common and important mechanism for cutting, marking, welding, and surface modifying substrates such as metals including stainless steel. The term "Laser" is an acronym for Light Amplification by Stimulated Emission of Radiation. The most common stimulating media are carbon dioxide gas and neodymium yttrium aluminum garnet (Nd:YAG).

Maximizing laser productivity depends on output power, laser beam quality, and ease of operation of the device for its intended purpose. One of the more common reasons for poor laser performance is the result of contamination of the laser apparatus, particularly the focusing lens. Sources of laser contamination include impurities in the laser gases or in the nozzle pressurizing gas, vacuum-system leaks, back-streaming of vacuum pump oil into the laser cavity, sputtering of metal atoms from electrodes, fingerprints and vacuum grease, and contaminants present where optics are stored, and the like.

Most laser systems use some type of nozzle in front of the final focusing lens. The nozzle delivers a pressurized gas to the workpiece and is designed to prevent debris from spraying onto the focusing lens. Contamination of the focusing lens is one of the prime reasons for poor laser performance and downtime of laser operations. However, no nozzle system is perfect and some debris, fume or backspatter will occasionally reach the lens.

More recently laser systems have employed a protective window to protect the focusing lens against contamination. The protective window is positioned in front of the focusing lens both of which are contained within a lens assembly. This system is disadvantageous because the protective window, requires modification or disassembly of the lens assembly to replace or renew the protective window which can alter the focal length of the laser beam. Such a system is frequently impractical because the lens holder is not designed to accommodate a protective window.

Lasers are a widely used means for cutting steel, stainless steel, aluminum, titanium, plastic wood and other substances. They are also used for welding. In many cutting applications high pressure gas, known as assist gas, is used to aid in the cutting process. Oxygen under pressure is used to cut carbon or mild steel. Nitrogen assist gas is commonly used to cut stainless steel and argon and helium are used to cut titanium. Gases used to cut substances other than mild steel tend to be used under higher pressures than oxygen used to cut mild steel. The assist gases perform various functions depending upon the material being cut.

Oxygen reacts with the iron in mild steel and releases energy which causes more rapid melting of the steel than the laser alone would cause at the same power level. The reaction of oxygen with iron effectively doubles the energy output of the laser. Stainless steel is cut with inert assist gas because oxygen cutting leaves an undesirable dark adherent scale on the surface and produces rough edges on thicker pieces. Due to the absence of the oxygen-iron reaction, higher power must be used to cut stainless steel.

The high viscosity of stainless steel melted by $CO_2$ laser cutting causes dross adherence to the bottom edge of the material. To solve this problem, very high assist gas pressures are blown through the kerf to drive off the dross. Assist gases may also be used to blow the "spatter" generated by the cutting process away from the laser's focusing lens and for cooling the focusing lens. Assist gas is introduced to the cutting area through the cutting head of the laser and is delivered to cutting area by the same nozzle through which the laser beam passes. When the assist gas is introduced into the cutting head it is in the same chamber in which the focusing lens is situated and the gas therefore applies pressure to the lens.

The smoke and steel particles arising out of $CO_2$ laser cutting and welding processes are known as "spatter". Spatter can damage a laser focusing lens or the anti-reflective coating that is deposited on the lens to enhance the transmission of energy through the lens. Spatter tends to be small particles which adhere to the focusing lens or the anti-reflective coating on the lens. Spatter can burn and pit the lens and the coating. The energy that a focusing lens transmits decreases as spatter damage and contamination build up on the lens, until the point is reached that insufficient energy is transmitted to the focal point of the laser for the efficient cutting to continue. At that point the lens must be replaced. $CO_2$ laser focusing lenses are quite expensive.

Recently, users of certain laser systems have employed protective windows in front of the focusing lens to protect the focusing lens from spatter. These protective windows are normally added by the user and, to date, no means of using them is provided by any laser system manufacturer. However, users with systems with sufficient room in the focusing lens mount have placed protective windows in front of the lens with limited success. Many users have laser systems in which the lens mount will not accommodate a protective window unless the focusing lens is moved. But, moving the lens alters the focal point of the laser beam. If the system does not provide the focusing flexibility to accommodate movement of the focusing lens or if there is not sufficient room in the lens mount for another optic, then the protective window cannot be inserted without some modification or addition to the lens mount that will accommodate a protective window. For this reason many users of laser welding and cutting systems have been prevented from using protective windows.

NaCl and KCl are the materials that are most practical to use as protective windows. Unfortunately, protective windows made from these materials will break under pressure. Accordingly, the use of protective windows has been largely confined to $CO_2$ laser welding systems where assist gases are not used and pressure on the protective window is not a factor.

Since most cutting lasers operate at high pressure at least part of the time, a means must be devised to deal with the pressure to make use of protective windows practical in cutting applications. Merely making room for the protective window in the lens mounting system does not deal with the pressure.

The typical protective window used in a $CO_2$ laser is a crystal material made of NaCl or KCl. These window materials are economical and they will transmit 90% or more of the available energy in a $CO_2$ laser system without an expensive anti-reflective coating, but these materials will not withstand the high pressure assist gases used for cutting.

As noted above, there are no laser cutting systems on the market made by any major laser manufacturer that accommodate protective windows. The employment of a method or apparatus that allows a protective window to operate in pressure neutral environment or is otherwise protected from assist gas pressure is constrained by the geometry and other design features of industrial lasers in which it is desirable to employ a protective window. Certain laser systems employ lens mounting configurations which do not leave enough room to employ means for use of protective windows in the presence of high assist gas pressures, and other laser systems employ proprietary designs incorporating features such as automatic focusing that make it impractical to alter or add to the manufacturer's lens mount design. According to a recent survey published by Industrial Laser Review, there are many thousands of industrial laser welding and cutting systems in the field and 1200 new cutting systems are being sold annually. Since none of the laser systems mentioned provide means for use of protective windows and since the cost of replacing damaged focusing lenses in such systems is material, it would be a significant advance in the art to provide a method and device for protecting focusing lenses in such laser systems from spatter.

Apparatus for holding protective windows in front of laser focusing lens is known in the art. Cosmescu (U.S. Pat. No. 5,312,397) and Diakuzno (U.S. Pat. No. 4,592,353) disclose devices intended to protect the optics of lasers employed in surgical processes from blood and body fluids that would impair their operation during procedures such as laser laparoscopy. These devices are employed in systems which are entirely different than industrial $CO_2$ laser cutting systems. The devices disclosed by Cosmescu and Diakuzno are used in low power lasers. The device disclosed by Diakuzno relates to fiber optic systems for Nd:YAG and Argon lasers, not high power industrial lasers such as $CO_2$ lasers.

More important, the blood and body fluids that foul the optics in a surgical procedure are considerably different from such substances as molten metals and molten plastics that attack the optics in a $CO_2$ laser cutting system. The latter are mostly solids which do permanent damage by adhering to the lens or burning and pitting the lens, whereas the former are mostly water and can be wiped off. The economical protective windows that are practical to use for $CO_2$ cutting lasers, such as NaCl and KCl, could not be used in surgery because they are water soluble; whereas in a surgical procedure an expensive insoluble crystal such as sapphire can be used and reused as a protective window. It would not be practical to use sapphire in a cutting laser because it is considerably more costly than NaCl and KCl. In fact, sapphire is just as costly as Zinc Selenide (ZnSe), the material from which focusing lenses are made. It makes no economic sense to sacrifice a sapphire protective window for a ZnSe lens in an industrial laser. Although a sapphire protective window could be cleaned and reused in the surgical setting, it would be quickly destroyed in an industrial cutting or welding setting.

Another significant difference between high power $CO_2$ laser cutting systems and the low power surgical laser systems in which the devices disclosed by the prior art are intended to be used, is the use of assist gas at pressures of 30 psig or higher to cut stainless steel and other substances in the $CO_2$ laser cutting systems. High pressure assist gas is not used to cut human tissue during surgery. The high pressure assist gas used in $CO_2$ laser cutting systems is not addressed by Cosmescu or Diakuzno. The use of inexpensive materials as protective windows in $CO_2$ laser cutting systems requires use of a method of employing an optical mounting device or an apparatus that neutralizes assist gas pressure to provide support for the protective window such as the method and apparatus disclosed in this application.

Finally, the devices disclosed in the prior art are intended to be incorporated into systems and apparatus that are designed to accommodate protective windows whereas the instant invention is intended to be suitable for retrofitting into existing systems as well as to be incorporated into new designs.

SUMMARY OF THE INVENTION

The present invention is directed to a protective window assembly and to its use with or integral with a focusing lens assembly in a laser beam generating apparatus in which the focusing lens is protected by the protective window contained within the protective window assembly. The protective window assembly is either releasably secured to the focusing lens assembly containing the focusing lens or integral therewith. When the focusing lens assembly and the protective window assembly are secured together the focusing lens is effectively protected from contamination in a cost efficient and effective manner. Replacement or renewal of the protective window can often be accomplished without altering or disassembling the focusing lens assembly.

In particular, the present invention is directed to a protective window assembly alone which can be releasably secured to or is integral with a focusing lens assembly for use with a laser beam generating apparatus. The protective window assembly comprises:

(a) a housing having a cavity for securing a protective window therein; and (b) securing means for securing the housing to a focusing lens assembly containing a focusing lens.

In one aspect of the invention, the housing for securing the protective window is releasably securable to a focusing lens assembly. In an alternative embodiment of the invention, the protective window assembly is integral with the focusing lens assembly.

In a preferred aspect of the present invention, the protective window assembly housing allows the passage of gas therethrough to equalize pressure about the protective window to thereby prevent rupture or breakage of the protective window.

In another embodiment the protective window is protected from breaking under pressure by placing it directly against the flat (plano) surface of the focusing lens so that a large portion of the plano surface of the barrier or window is in contact with a large portion of the plano surface of the lens, thereby significantly increasing the strength of the protective barrier or window because of the additional support provided by the focusing lens. In a preferred embodiment of the invention, holes are drilled in the protective window to allow the high pressure assist gas to pass through the window and either (i) a small spacer is placed on the work side of the lens between it and the protective window to create a hollow cavity or (ii) a flange is placed in the lens mount which is integral to the mount and performs the same function as the spacer. In both embodiments, the protective window or the protective window and the spacer (or flange) can be accommodated within an exiting system in the same cavity within which the lens is situated by making additional room by means of (i) elongating or deepening the existing cavity, (ii) substituting a thinner focusing lens with the same focal length as is used in the lens previously employed, (iii) reducing the size of one or more components that secure the lens such as springs or retaining screws, (iv) moving the focusing lens where there is sufficient capacity in the system to adjust the focus so that the focal point of the laser beam is not altered, or (v) a combination of the steps described in (i) to (iv).

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

The present invention is directed to a protective window assembly and to its use in conjunction with a focusing lens assembly for protecting a focusing lens used in a laser beam generating apparatus. The protective window assembly employed in the present invention protects the focusing lens against contamination and breakage and provides such protection in a cost efficient and effective manner. The protective window assembly may be sold alone or may be combined as either a removable or integral part of a focusing lens assembly which can be inserted into a laser beam generating apparatus.

Figure 1:
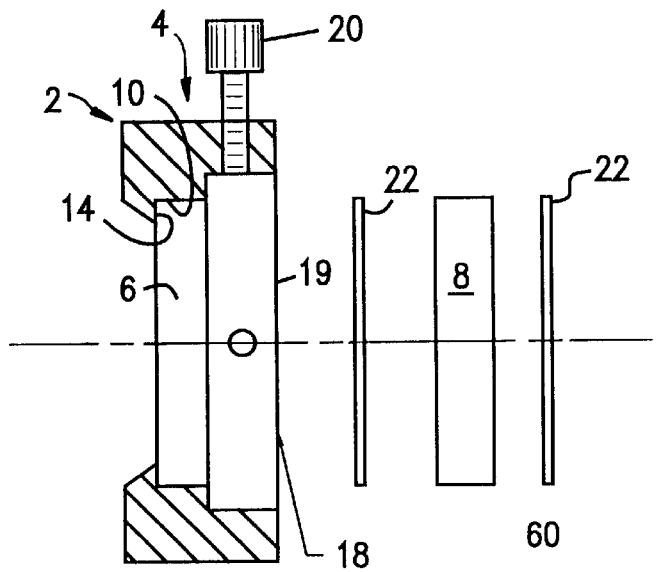
FIG. 1 is a partially exploded side view of a window assembly in accordance with the present invention.
Figure 2:
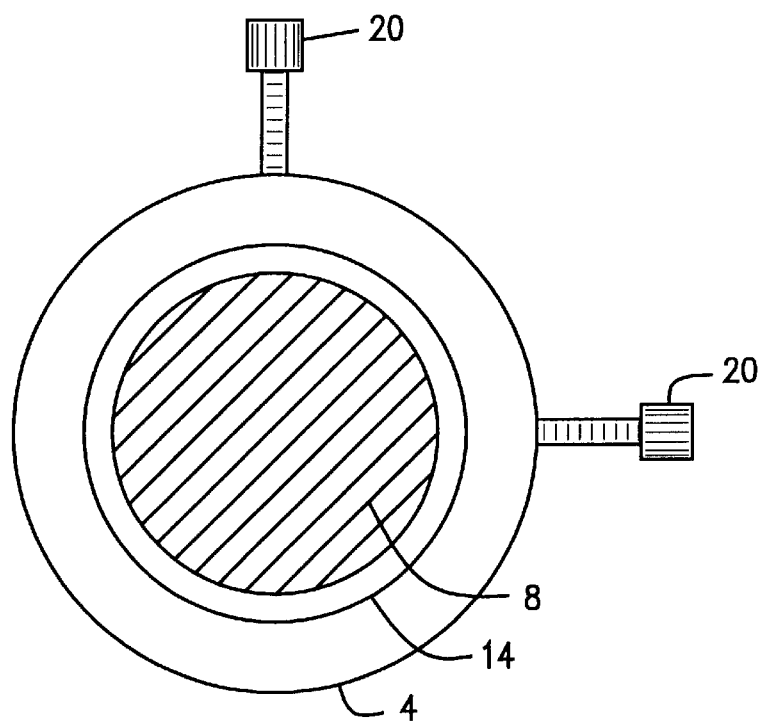
FIG. 2 is a front view of the embodiment of the window assembly shown in FIG. 1.
Figure 3:
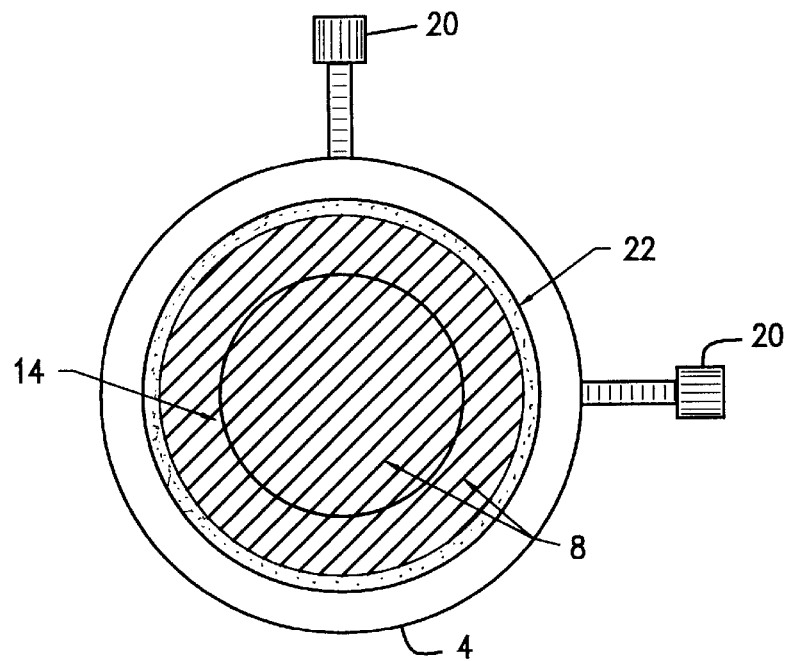
FIG. 3 is a rear view of the embodiment of the window assembly shown in FIG. 1.

Referring to FIGS. 1–3, there is shown a protective window assembly for use in accordance with the present invention. The protective window assembly 2 includes a housing 4 defining a seat or cavity 6 for receiving a protective window 8, typically made of an optical material which is highly transmissive and relatively non-absorbing at a wave-length particular for the laser medium (e.g. $10.6\mu$ for $CO_2$ lasers). Such optical materials, include potassium chloride, sodium chloride and the like. The cavity 6 is defined by opposed walls 10 and 12 of the housing 4 and a flange 14 against which the protective window 8 rests when secured within the cavity 6. The cavity 6 preferably has a shape complimentary to the shape of the window. In a preferred form of the invention both the protective window and the seat are in the shape of a cylinder.

The housing 4 has a forward end 16 and a rearward end 18. The forward end 16 is positioned in proximity to the target (e.g. workpiece) which is to be contacted by the laser beam. The rearward end 18 of the housing 4 has an opening 19 for receiving the protective window 8. Thus, the protective window 8 lies between the workpiece and the focusing lens as explained in detail hereinafter.

The cavity 6 must be of sufficient size to house the protective window 8. In addition, there must be provided some means of securing the protective window assembly 2 to an assembly containing the focusing lens. The securing means may be in the form of threads and grooves, set screws, O-rings, cap screws and other similar means.

As shown specifically in FIGS. 1–3, set screws 20 are provided to secure the protective window assembly 2 to the assembly containing the focusing lens. The set screws 20 are insertable into the housing 4 so that they may contact the assembly containing the focusing lens as it lies within the seat 6 as discussed in detail hereinafter.

In one embodiment of the invention, at least one and preferably a pair of gaskets 22 are employed to provide a seal around the protective window 8 so as to provide added protection for the protective window against breakage. A protective gasket 22 may be provided within the seat 6 against the flange 14 followed by the protective window 8. In a still further embodiment, a second gasket, as specifically shown in FIG. 1, may be provided on the rearward side of the window 8 within the cavity 6.

In a preferred form of the invention, the protective window assembly mates with a lens assembly containing a lens mount and a focusing lens therein used to focus the laser beam in the direction of the workpiece. The mating of the protective window assembly and lens assembly enables the user to readily employ a protective window in accordance with the invention in a cost efficient manner. The protective window assembly may be prepackaged and when use of the laser is desired, engaged to the lens mount. The protective window assembly can be readily removed and replaced by another assembly or renewed by repolishing or replacing the protective window without significant downtime of the laser operation.

Figure 4:
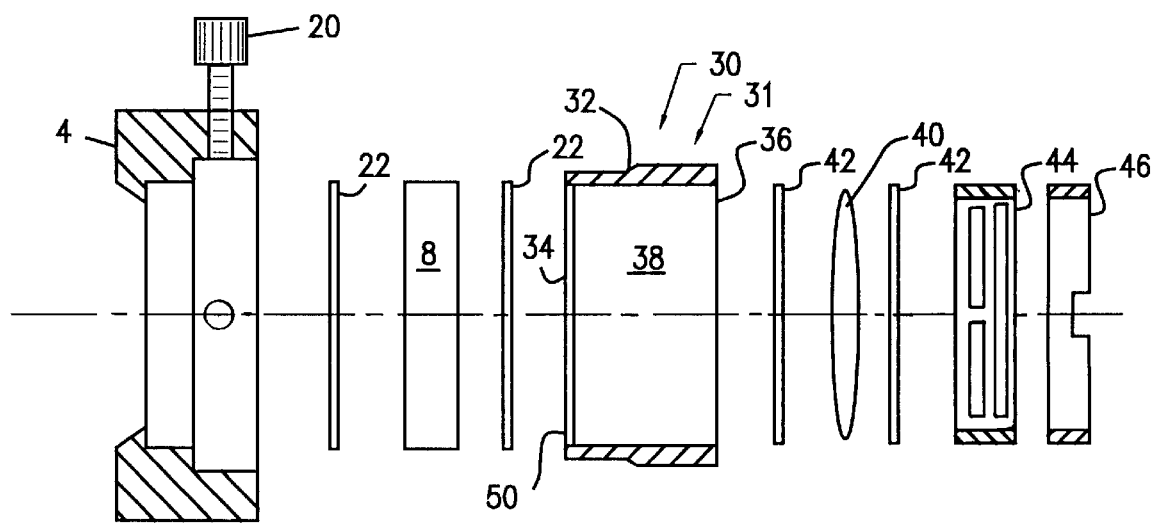
FIG. 4 is an exploded view of a focusing lens assembly including the window assembly shown in FIG. 1.

Referring to FIG. 4, there is shown a lens assembly 30 comprised of a lens mount 31 including a housing 32 having a forward end 34 and a rearward end 36. The respective ends 34 and 36 define an area 38 for securing a focusing lens 40 as well as other lens mount components therein. Typical lens mount components include seals 42, a compression spring 44 for urging the focusing lens 40 securely within the space 38, and a retaining ring 46 for securing all of the lens mount components within the space 38.

The lens mount 31 is releasably secured to the window assembly 2. In this regard, the lens mount 31 and/or the window assembly 2 are provided with a means for releasably securing the same together during laser operations. The window assembly and lens mount may thereafter be separated when the laser operation is terminated.

Figure 5:
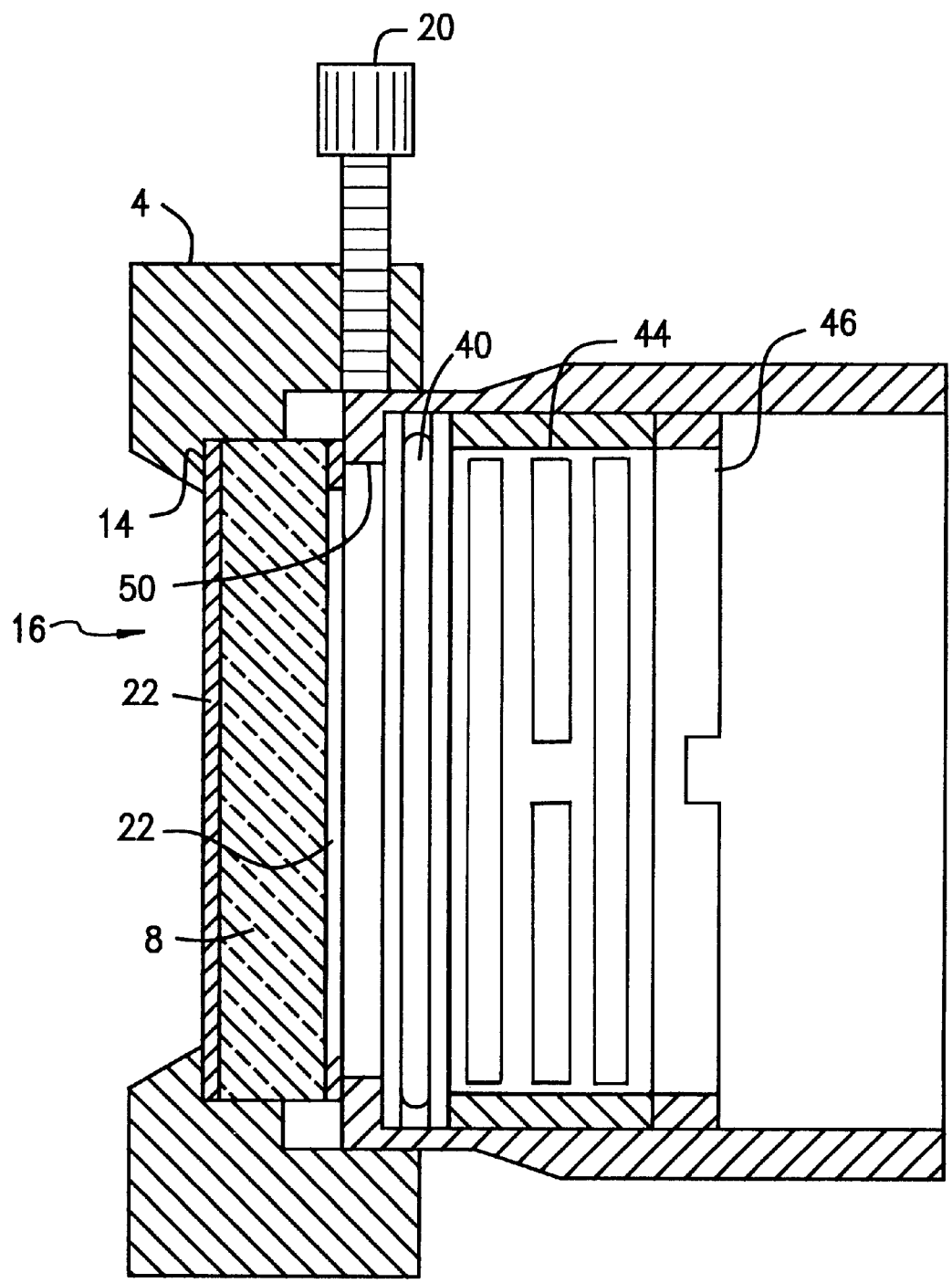
FIG. 5 is a cross-sectional side view of the focusing lens assembly shown in FIG. 4.

Referring to FIG. 5, there is shown a fully engaged protective window assembly 2 to a focusing lens assembly 30. The protective window 8, shown positioned between respective gaskets 22 lies between the forward end 16 of the protective window assembly 2 and the focusing lens 40 positioned within the lens mount 31. In this way, debris such as oil, dirt, grease and the like cannot contact the lens because of the position of the protective window 8 within the cavity 6 of the protective window assembly 2.

The lens mount 31 may be releasably secured to the protective window assembly 2 in a variety of ways. As shown specifically in FIG. 5, the housing 32 of lens mount 31 is engaged by set screws 20. The set screws 20 can be rotated to contact the housing 32 to secure the lens mount 31 to the protective window assembly 2. In a preferred form of the invention, an integral flange 50 extends from the housing 32. The flange 50 is placed against the protective window directly or through the gasket 22 with sufficient force to maintain the protective window 8 in a fixed location with the protective window assembly 2. The flange is secured in place as is, and the lens mount 31 secured to the protective window assembly 2, by the pressure exerted by the set screws 20 on the housing 32.

As previously indicated, alternate means of securing the lens mount to the protective window assembly can be employed such as through the use of O-rings, threads and grooves and the like.

Figure 6:
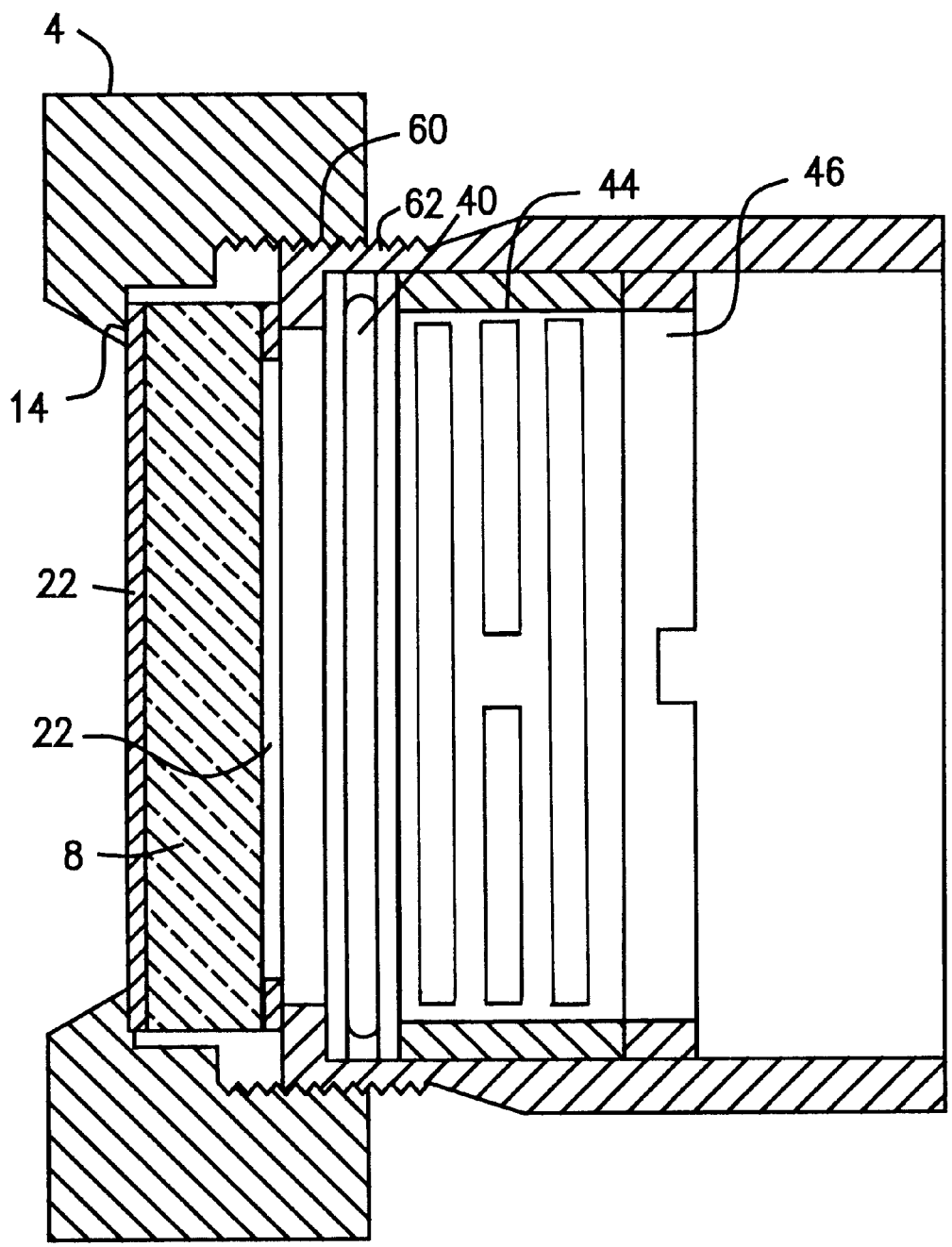
FIG. 6 is a cross-sectional side view similar to FIG. 5 using threads and grooves to secure the lens mount and protective window assembly together.

Referring to FIG. 6, there is shown an embodiment of the invention wherein the lens mount can be screwed into operative engagement with the protective window assembly. More specifically, the housing 32 of the lens mount 31 in proximity to the forward end 34 is provided with grooves 60. The housing 4 in proximity of the rearward end 18 of the protective window assembly 2 is provided with corresponding threads 62. In operation, the lens mount 31 is secured to the protective window assembly 2 by rotating the lens assembly until the grooves 60 mate with the corresponding threads 62. The protective window assembly can be disengaged by rotating the same in the opposite direction until the threads 62 are released from the grooves 60. It will be understood that protective window assembly 2 can be provided with grooves and the lens mount with threads to achieve the same mode of operation.

Figure 7:
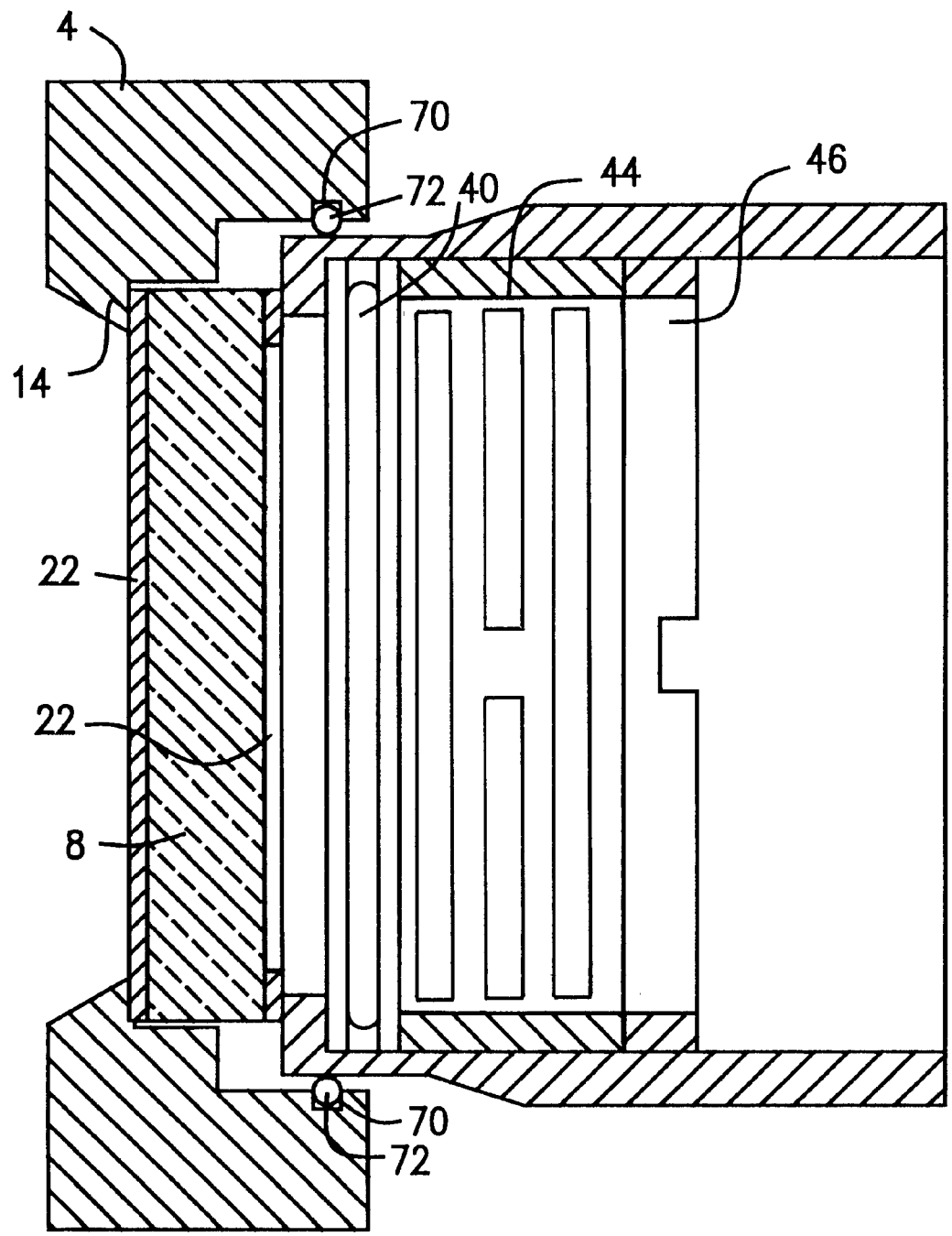
FIG. 7 is a cross-sectional side view similar to FIG. 5 using an O-ring to secure the lens mount and the protective window assembly together.

In another embodiment of the invention, the protective window assembly 2 is engaged to the lens mount 31 through an O-ring within the housing. Referring to FIG. 7, the housing 4 of the protective window assembly 2 has an annular channel 70 containing an O-ring 72. The O-ring engages under pressure the housing 32 of the lens mount 31 to thereby urge the lens mount 31 within the seat 6 of the protective window assembly 2.

In a further embodiment of the present invention, the lens mount is provided with a tapered flange. There is also provided an adapter having an O-ring thereon. The adaptor is press-fitted on to the lens mount and the same is inserted into the protective window assembly in a manner similar to that described in connection with FIG. 7.

Figure 8:
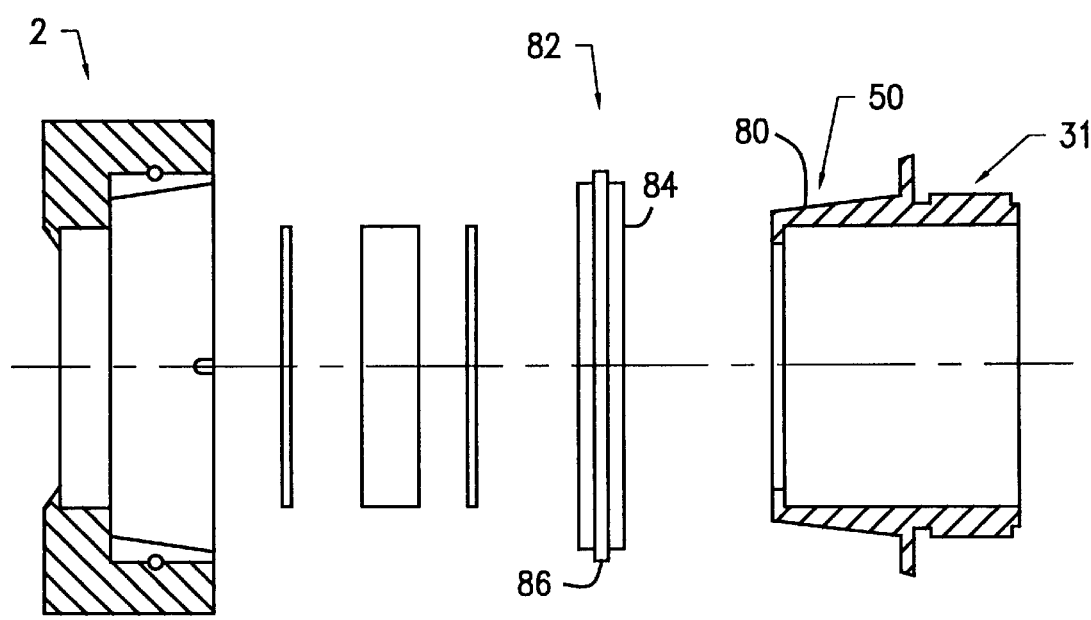
FIG. 8 is a cross-sectional side view of another embodiment of the invention for securing the lens mount and the protective window assembly together.

Referring to FIG. 8 there is shown a typical lens mount 31 having a flange 50 at the forward end 34 thereof as described in connection with FIG. 4. The flange 50 frequently has a taper 80. The taper is typically in the range of from about 10 to 20 degrees. As shown specifically in FIG. 8, it is necessary to provide an adaptor 82 having a tapered interior surface 84 thereof which can be secured about the tapered surface 80 of the flange 50 of the lens mount 31 when the lens mount and adaptor 82 are secured together. Placed about the adaptor 82 is an O-ring 86 which secures the lens mount 31 to the protective window assembly 2 as described previously in connection with FIG. 7.

When the protective window assembly 2 and the lens mount 31 are secured together as described in the embodiments shown in FIGS. 5–8, the protective window 8 lies between the focusing lens 40 and the target (e.g. workpiece) (not shown) lying beyond the forward end 16 of the protective window assembly 2. This results in a highly efficient form of protection for the focusing lens during operation of the laser.

Gases (e.g. nitrogen) under high pressure are used to assist in the laser operation. The assist gas provides an atmosphere superior to shop air to enhance the cutting action and, as described previously, to also blow away splatter from the focusing lens. Under some circumstances such as in the cutting of stainless steel, the pressure of the gases can be very high (e.g. 150 to 300 psig). High pressure gas can break or rupture the window which is used to protect the lens. In accordance with a preferred embodiment of the present invention there is provided an embodiment wherein the high gas pressures around the protective window are neutralized.

Figure 9:
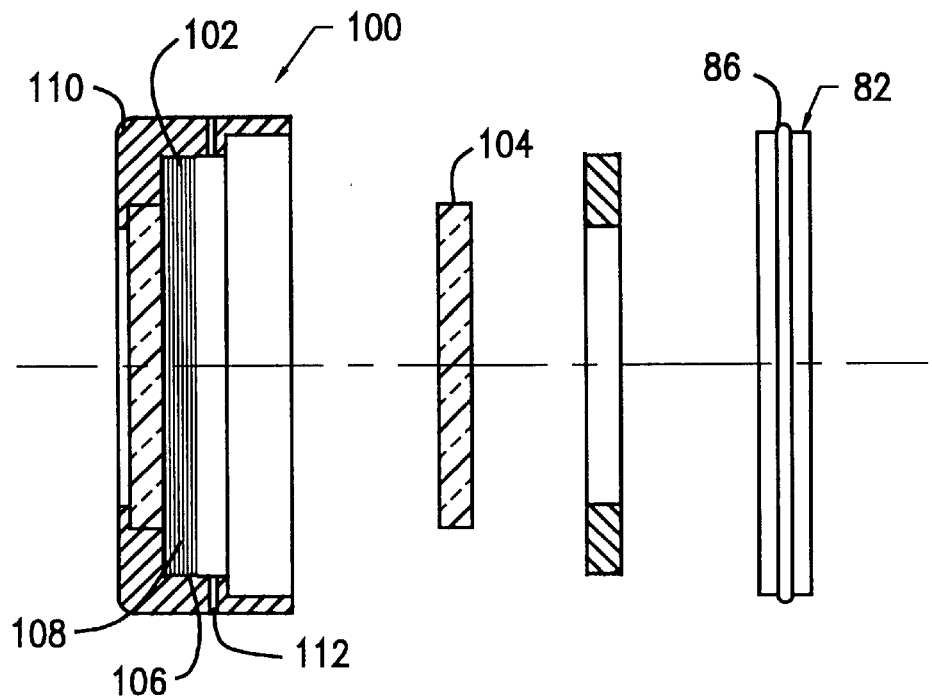
FIG. 9 is a cross-sectional exploded side view of an embodiment of the invention in which the housing for the protective window contains holes for equalizing pressure about the protective window.
Figure 10:
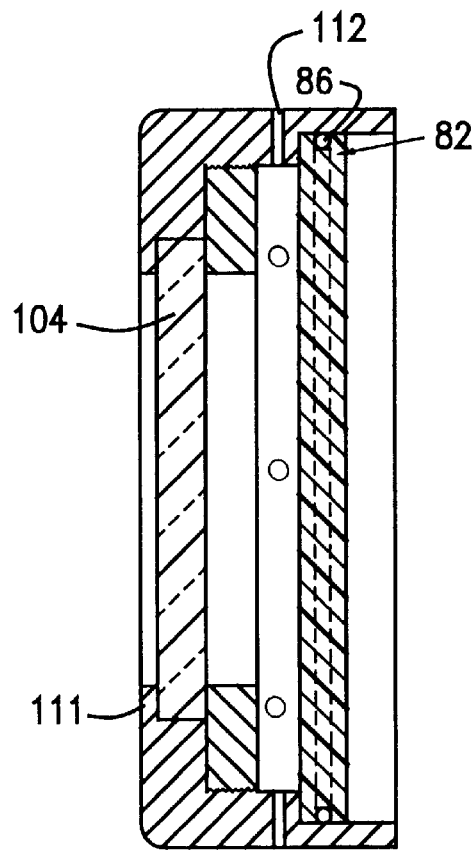
FIG. 10 is a view similar to FIG. 9 showing the protective window secured within the housing.

Referring to FIGS. 9–10, the protective window assembly 100 includes a holder 102 for the protective window 104. The holder 102 is shown with a threaded retaining screw 106 that mates with corresponding grooves 108 within the housing 110 to secure the holder therein. Included as part of the holder 102 is a seat 111 for securing the protective window in operative position within the protective window assembly 100.

In accordance with the present invention, the holder 102 is provided with at least one aperture 112 which allows the high pressure gas to pass around the protective window 104. The gas pressure therefore equalizes (i.e. similar or equal pressures are exerted on the front and the back of the protective window). The equalization of pressure about the protective window is desirable because protective windows are made of materials (e.g. potassium chloride) which generally have low apparent elasticity.

In operation, the protective window 104 is inserted into the holder 102 and the adaptor 82 with the O-ring 86 thereon is secured within the holder 102. The combined assembly (i.e. the holder and the adaptor) are reversibly secured to the housing 110. If excess gas pressure is exerted on the protective window 104 during operation of the laser, the gas passes through the apertures 112 until pressure on the front and back side of the window is equalized.

The protective window assembly of the present invention can be utilized for any laser beam generating assembly such as for carbon dioxide lasers and Nd:YAG lasers as well as others.

The protective window assembly may be constructed so as to be part of the focusing lens assembly either releasably sealed thereto or integral therewith.

Figure 11:
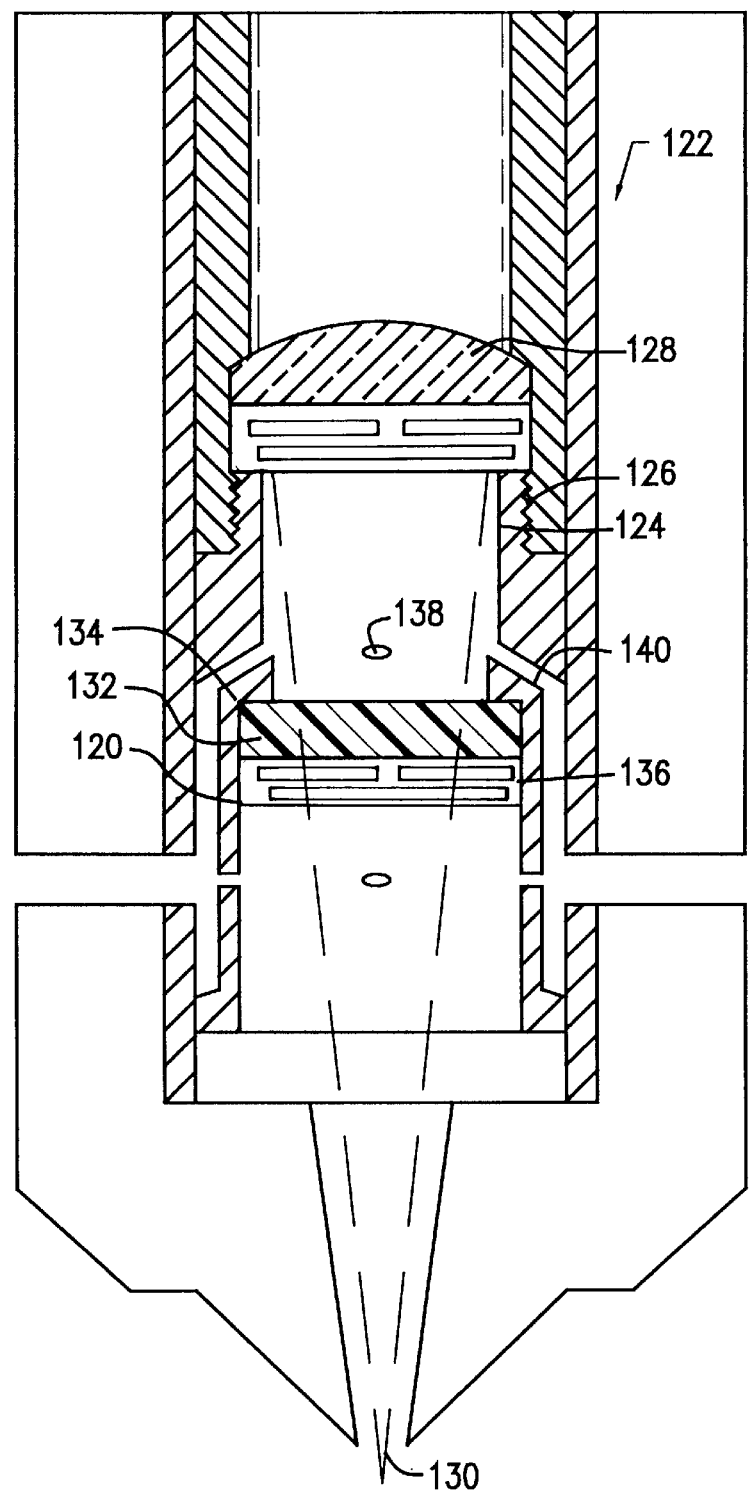
FIG. 11 is a cross-sectional view of an embodiment of the invention wherein the protective window is secured within the lens assembly.

Referring to FIG. 11, there is shown a protective window assembly 120 secured within a lens assembly 122. In particular, the protective window assembly 120 includes a housing 124 which may be releasably secured to the lens assembly 122 through a securing device 126 such as threads and grooves or may be integral with the lens assembly (i.e. not removable therefrom).

The protective window assembly is shown between the focusing lens 128 and the focal point 130 of the laser beam. The protective window 132 is maintained in place by a flange 134 and a retaining device 136 such as a retaining screw or a compression spring. Removal of the protective window 132 can be accomplished by releasing the retaining device 136.

As described in connection with the embodiments of FIGS. 9 and 10, the protective window assembly may be provided with means for equalization gas pressure about the protective window. As shown in FIG. 11, assist gas which enters the lens assembly through one or more inlets 138, can move around the protective window 132 through openings 140 in the housing 124.

It will be understood that the protective window assembly 120 shown in FIG. 11 is releasably secured within the lens assembly 122. Alternatively, the protective window assembly 120 may be made integral with the lens assembly 122 by eliminating the securing device 126. The protective window 132 would, in this embodiment, be releasable from the protective window assembly by releasing the retaining device 136.

The elasticity of NaCl and KCl and other materials that are economically practical to use as barriers to protect focusing lenses in industrial lasers is lower than that of materials used for $CO_2$ laser focusing lenses such as zinc selenide (ZnSe). The focusing lenses that are used in $CO_2$ laser systems that are designed for applications such as cutting stainless steel must withstand assist gas pressures in the 300 psig range. The use of such high pressure assist gas is typical only of high power laser (250 watts or more) used in cutting. Assist gas at high pressure is not found in medical applications of $CO_2$ lasers and the optics in such systems do not have to withstand high pressures. In such higher pressure applications, many barrier materials such as KCl and NaCl will break if a method or apparatus dealing with high pressure is not employed.

Most high power $CO_2$ laser systems now on the market for cutting applications are not designed to accept devices that hold windows that protect the focusing lens from spatter and other damage. This size and shape of the cutting heads and lens mounts employed in many of these systems leave little or no room for modifications that permit addition of protective barrier windows. Furthermore, many systems do not allow for the flexibility to materially alter the focusing parameters that were incorporated into the system on the assumption that the position of the focusing lens will not be changed. Therefore, it is almost always necessary to accommodate a mounting system for a protective window or barrier window to the constricting geometry of the components of the laser system that contain either the focusing lens or the mounting device for the focusing lens. Furthermore, this accommodation must almost always be made without changing the position of the focusing lens, because doing so will change the focal point of the laser where the cutting action takes place and many existing laser cutting systems are not designed with sufficient focusing range to permit focusing to correct such a change in focal point. When there is enough room and the shape of the cutting head and lens mount are not unduly constricting, the method and apparatus previously described can be employed.

But, there are many cutting heads and lens mounts configurations which make it impossible to alter or add to the exterior geometry of the hardware comprising the lens mount or to change the location of the lens due to functional and geometric constraints imposed by the laser cutting systems in which these heads and mounts are employed. These geometry and system constraints are not addressed by the prior art which is directed to low pressure laser systems such as used for surgery.

The present invention and especially the embodiments which are described hereinafter are directed to a protective window assembly in which the pressure imposed by assist gas used in laser cutting is neutralized by means that do not materially alter the exterior dimensions of the focusing lens mounting hardware. This is accomplished by means of either pressing the flat surface of the protective window against the flat surface of the focusing lens in those systems in which a plano convex lens is employed or, in a preferred embodiment, by using a protective window which is drilled to allow assist gas to flow into a cavity between the focusing lens and the protective window so that the pressure equalizes on both sides of the protective window.

In one preferred embodiment of the invention employing a drilled window, the cavity between the focusing lens and the protective window is created either by means of inserting a small cylindrical spacer (e.g. about 1 mm to 2 mm thick and 1 mm to 2 mm wide) between the lens and the protective window.

In another preferred embodiment of the invention employing a drilled window, the spacer is replaced by a small flange located on the inside diameter of the cylindrical portion of the lens mount on which the work side (cutting side) of the lens seats as a means of creating a cavity between the lens and the protective window. The protective window seats on the opposite side of the same flange. Such a flange has the advantage of positively locating the lens in those systems where the lens is not seated on its upper (typically convex) surface. The use of a flange instead of a spacer has the advantage of being both means of creating a cavity between the lens and the protective window for purposes of neutralizing the pressure on the protective window and means of positively locating the lens so that the focal length cannot be altered.

In all embodiment of this aspect of the present invention sufficient room is made to mount the protective window and to accommodate the spacer or flange used to create a cavity by means of:

(a) reducing the size (thickness) of the various components of the lens mounting assembly, such as, but not limited to (i) the lens, (ii) the spring, (iii) the retaining screw, (iv) any segment of the lens mount which can be shortened; (b) removing non-essential components such as spacers and wave springs; and (c) moving the lens back away from the work end (cutting end) by a small distance which does not exceed the focusing capability of the system.

Figure 12:
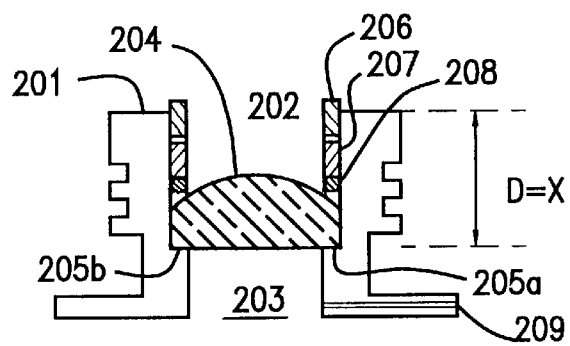
FIG. 12 shows a cross section of the component parts of a lens mount of the type typically used in certain Mitsubishi $CO_2$ laser systems to mount the focusing lens, wherein there is limited scope to enlarge the apparatus to accommodate a protective window and to also deal with the high pressure within the system in a way that will prevent breakage of the protective window.

FIG. 12 shows a cross section of a type of lens mount typically used by Mitsubishi to mount a focusing lens in a Mitsubishi $CO_2$ industrial laser system. The lens mount comprises a hollow cylindrical assembly 201 with an opening at each end 202, 203 in which the focusing lens 204 is seated on a flange 205a, 205b and secured in place by a retaining screw 206, spacer 207 and an "O" ring 208 so that the convex surface of the lens is at the laser (upper) end 202 of the assembly 201. The assist gas enters through holes 209 that are drilled around the circumference of the work end 203 of the cylindrical chamber in the assembly. The distance between the flange 205a, 205b on which the lens rests and the top of the assembly is represented by D=X.

Figure 13:
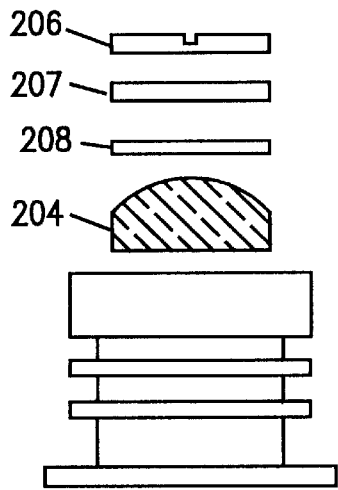
FIG. 13 shows an exploded view of the component parts of a lens mount of the type shown in FIG. 12.

FIG. 13 shows an exploded view of the internal components of FIG. 12 being a retaining screw 206 of the type that can be opened by use of a spanner wrench, a spacer 207, an "O" ring or gasket 208, and a focusing lens 204 which seats on the flange shown as 205a, 205b in FIG. 12.

Figure 14:
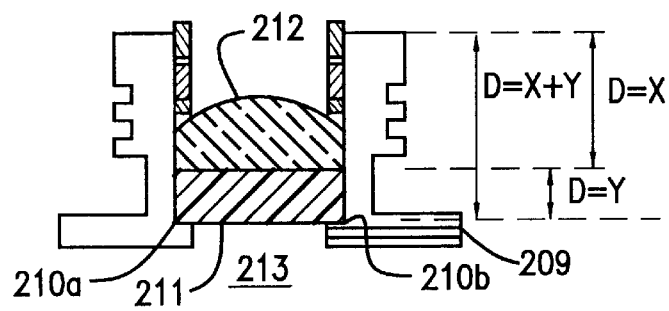
FIG. 14 shows a cross section of a preferred embodiment of the present invention being a lens mount of the type shown in FIG. 12 with means to employ a protective window.

FIG. 14 shows a cross section of a preferred embodiment of the present invention which is a lens mount which can be produced as a replacement for a lens mount of the type shown in FIG. 12. In this preferred embodiment the flange 210a, 210b has been bored deeper than the flange shown as 205a, 205b in FIG. 12 to accept a protective window 211. When this preferred embodiment of the invention is produced as a replacement for a lens mount of the style shown in FIG. 12, the invention has the same external geometry and dimensions and the location and size of the focusing lens are not altered by the modifications of the differences between the internal geometry of the invention and of the lens mount in the style of FIG. 12. A protective window 211 situated in the internal cylindrical chamber of the lens mount is pressed against the plano (flat) surface of a plano convex lens 212 as a means to provide enough support for the protective window 211 to prevent it from breaking when exposed to high pressure from assist gas introduced through the holes 209 around the circumference of the work end of the internal cylindrical cavity or chamber 213 of the assembly. It is understood that a drilled protective window could be used in such preferred embodiment to permit assist gas to cool the focusing lens. The protective window completely fills the work end of the cylindrical chamber 213 so that any spatter from the work will be blocked from coming into contact with the focusing lens 212. The incremental depth of the internal chamber extending the point where the flange is situated towards the work end of the chamber, which is required to accommodate the protective window, is represented by the expression "D=Y". Y is also the thickness of the protective window. The overall depth of the chamber with the protective window in place is represented by the expression "D=X+Y", with D being the sum of the distance (X) shown in FIG. 12 and the incremental space (Y) required to accommodate the protective window in a lens mount which has the same external geometry as that of the lens mount shown in FIG. 12.

Figure 15:
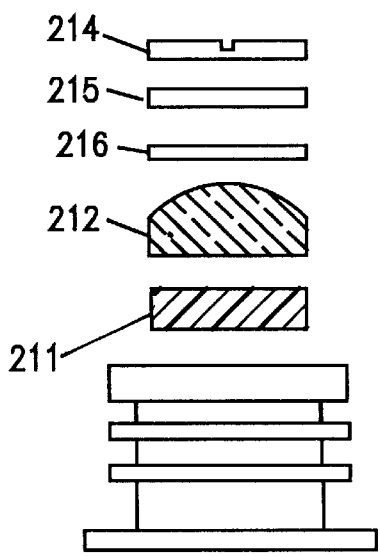
FIG. 15 shows an exploded view of the component parts of the lens mount shown in FIG. 14.

FIG. 15 shows an exploded view of the internal components of FIG. 14, being a retaining screw 214 of the type that can be opened by use of a spanner wrench, a spacer 215, an "O" ring or gasket 216, and a focusing lens 212 which seats on the protective window 211. The protective window seats on the flange 210a, 210b shown in FIG. 14.

Figure 16:
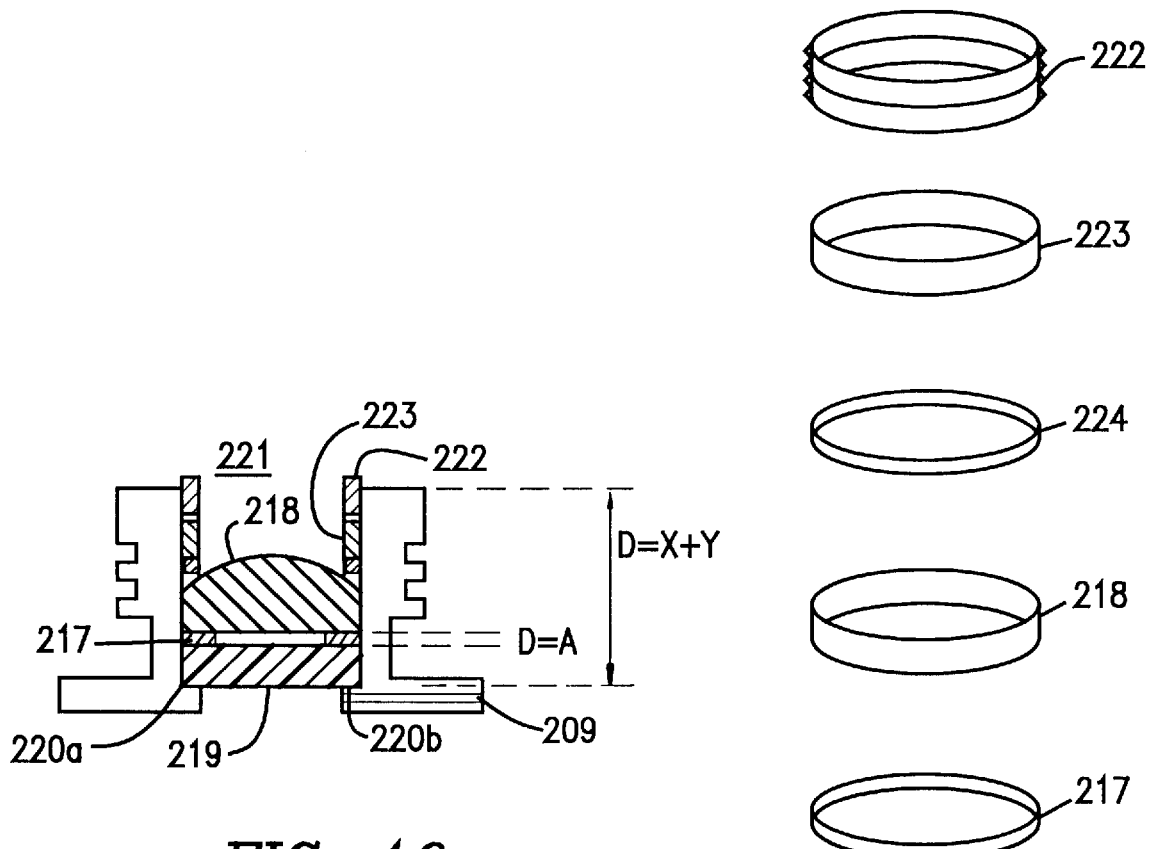
FIG. 16 shows a cross section of another embodiment of the present invention, being a lens mount of the type shown in FIG. 14 with alternate means of employing a protective window.

FIG. 16 shows a cross section of another preferred embodiment of the present invention which is a lens mount which can be used as a replacement for a lens mount of the type shown in FIG. 12. The flange 220a, 220b has been bored deep enough to accept a protective window 219. The preferred embodiment of the invention shown in FIG. 16 can be produced to have the same external geometry and dimensions as lens mounts of the type shown in FIG. 12 and the focal length of the focusing lens 218 can be produced so it is the same as that in the type of lens mount shown in FIG. 12 even though a thinner lens may be used. A protective window 219 in which holes have been drilled is situated in the internal cylindrical chamber of the lens mount in a manner that is intended to form a cavity between the protective window 219 and the work end of the lens 218.

The protective window 219 completely fills the work end of the cylindrical chamber so that any spatter from the work will be blocked from coming into contact with the focusing lens 218. The drilling of the protective window 219 allows assist gas to pass into the cavity created by the spacer or internal flange 217, thereby allowing the pressure to equalize both in front of the window 219 and behind the window in space within the cavity. This creates a pressure neutral environment for the window 219. The cavity is formed by a spacer or internal flange 217 situated between the work end of the lens and the window.

The thickness of the spacer or internal flange is "A" represented by the expression "D=A". In this representation of the preferred embodiment the overall depth (D) of the chamber is the same as in the other preferred embodiment shown in FIG. 14 viz X+Y, and is represented by the expression "D=X+Y". In this preferred embodiment the space taken up by the additional component not used in the embodiment shown in FIG. 14, which is the spacer or flange 217 separating the lens 218 and the protective window 219, is also represented by the expression "D=A". The requisite space (A) to accommodate the spacer or flange 217 is provided by making the lens thinner by "A", which is the same distance that was required to accommodate the spacer of flange 217. But, it is understood that all or part of the space required to accommodate the spacer protective window can be provided by making the protective window thinner by the distance "A" or by making both the protective window and the lens thinner. It is further understood that in a laser system with sufficient focusing capability, additional room could be made to accommodate the spacer or the protective window by moving the lens back towards the top of the cavity 221 in the lens mount and making one or more of the components such as the retaining screw 222 or the spacer 223 thinner. It is further understood that when a spacer or internal flange is added to separate the protective window and the lens that the lens may be of a different geometry than plano convex as a flat side is no longer required to support the protective window for the purpose of preventing it from breaking under pressure.

In this embodiment of the invention it is not necessary for the protective window to touch the lens to provide a means of preventing the window from breaking under the pressure applied by the assist gas, which makes this embodiment practical to use with focusing lenses that do not have a flat (plano) surface that will support the window, such as meniscus and diffractive lenses. It is also understood that the spacer could be eliminated between the lens 218 and the drilled protective window 219 if the work end surface of the lens is sufficiently convex to form a cavity in which the assist pressure can equalize.

Figure 17:
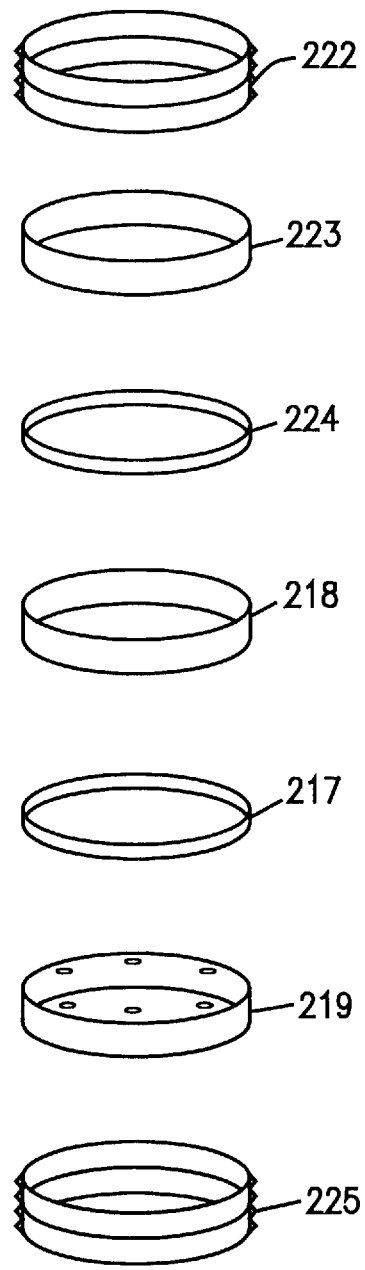
FIG. 17 shows a three dimensional exploded view of the interior components of the lens mount shown in FIG. 16 and an optional lower retaining screw.

FIG. 17 shows an exploded three dimensional view of internal components of the preferred embodiment of the present invention shown in FIG. 16, with the addition of an optional work end retaining screw 225. Such internal components are a retaining screw 222, a spacer 223, an "O" ring 224, a focusing lens 218, a spacer or internal flange 217, and a drilled protective window 219. It is understood that if an internal flange is used in place of a spacer, then it would be integral with the wall of the cylindrical internal chamber of the assembly shown in FIG. 16 and not a separate component. Such an internal flange 217 could be used in conjunction with a lower or work end retaining screw 225. The advantage of an internal flange 217 integral with the internal wall of the assembly chamber is that such a flange positively locates the lens and prevents accidental minor changes in the focal point of the laser beam. The use of a work end retaining screw assumes that the flange 220a, 220b shown in FIG. 16 on which the lens seats as shown in FIG. 16 will be removed and that the inside diameter of the cylindrical chamber of the assembly will be threaded (not shown) with a female thread (not shown) that will match a male thread on the retaining screw 225. The advantage of using an optional work end retaining screw 225 coupled with an internal flange 217 is that the protective window can be removed independently of the focusing lens simply by removing the retaining screw from the work end of the assembly while the lens remains undisturbed, thereby avoiding damage to the lens or the coating on the lens from mishandling when protective windows are placed. Use of a work end retaining screw may require use of a hole or other means (not shown) to assist gas to pass through or above it.

Figure 18:
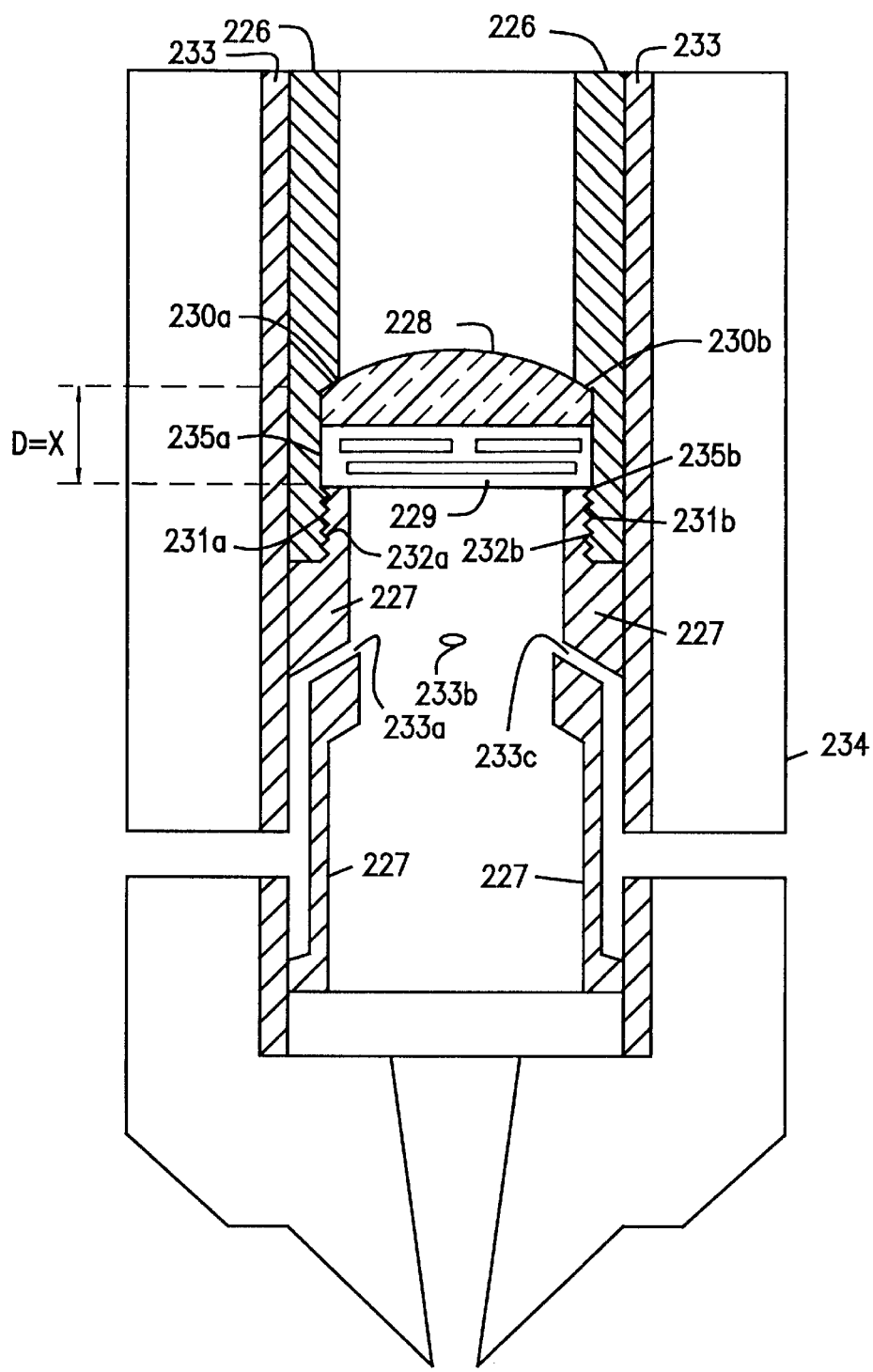
FIG. 18 shows a cross section of the component parts of a lens mount of the type typically used in certain $CO_2$ laser systems.

FIG. 18 shows a cross section of a lens mount of the type typically used by Trumpf to mount a focusing lens in the head of a $CO_2$ laser. The assembly comprising the lens mount contains two major components 226, 227 which screw together and compress the lens 228 and a spring 229 between them. The larger of the major components 226 has a flange or shoulder 230A, 230B on which the convex side of the lens seats and also contains a female thread 231, 231B which mates with male thread 232A, 232B of the other major component 227. The lens mount assembly contains holes 233A, 233B, 233C which direct the assist gas towards the lens to cool it and to drive away spatter. A spring 229 is situated beneath the focusing lens 228 to allow for thermal expansion of the lens and to prevent damage by accidental over tightening. The spring and the lens are held in place by the flange or shoulder 235a, 235b created by the top of the lower section of the lens mount 227 and the flange on which the convex surface of the lens seats 230a, 230b. Because the geometry of this style of lens mount is complex and the lens mount is closely confined within a cylinder or tube 233 within the cutting head 234, it is impossible to add to the lens mount assembly or to change its external geometry without redesigning the entire cutting head and any modification to the lens mounting assembly that would allow the assist gas to flow into a cavity behind the protective window while not blocking the laser and while maintaining the same focal length would be either impossible or extremely complex and expensive to execute.

Figure 19:
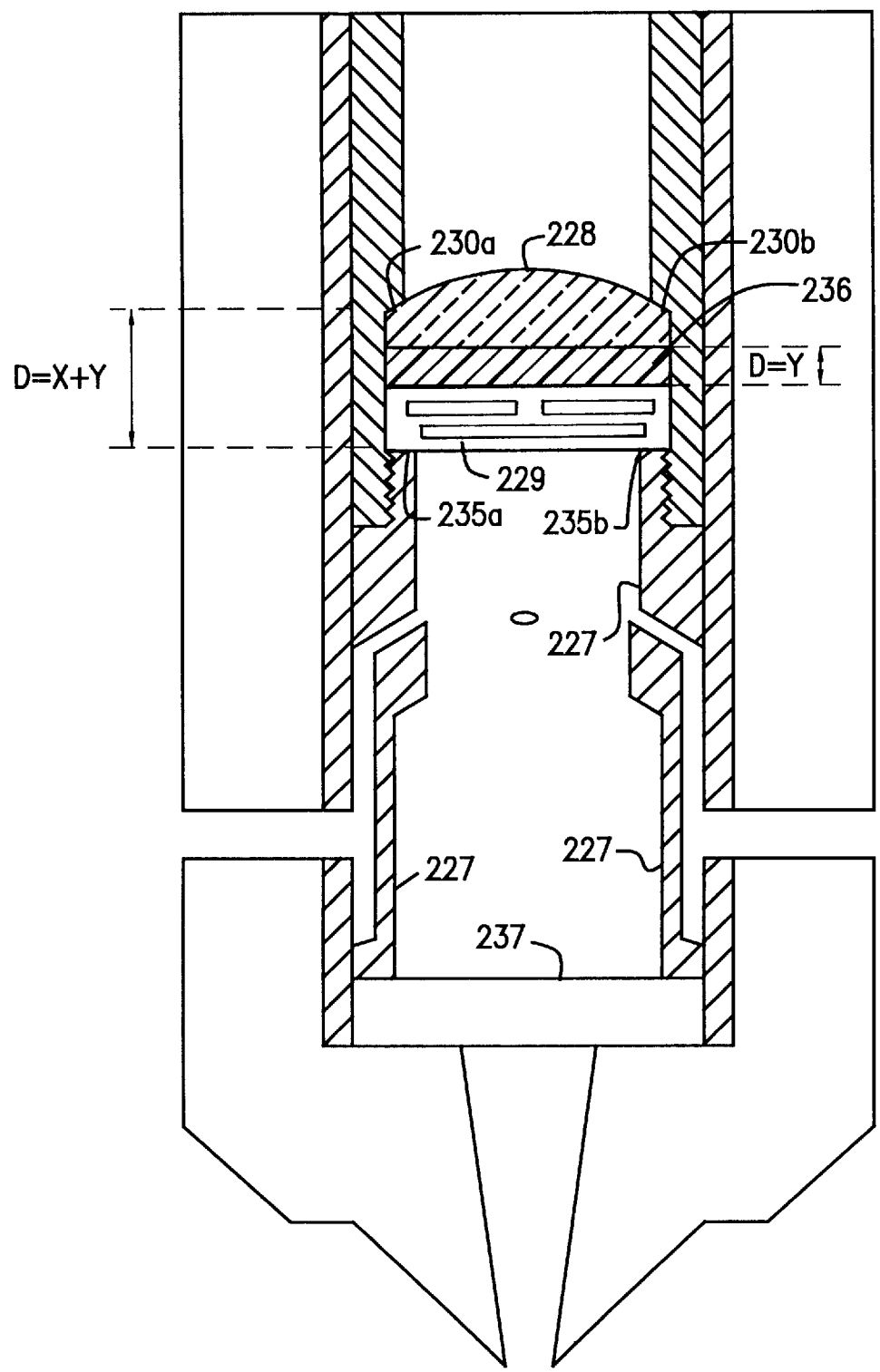
FIG. 19 shows a cross section of a preferred embodiment of the present invention being a lens mount of the type shown in FIG. 18 with means to employ a protective window.

FIG. 19 shows a cross section of a preferred embodiment of the present invention wherein a protective window 236 having the thickness "Y" (represented by the expression D=Y) is placed in a lens mount. It is understood that this preferred embodiment of the invention may be used as a replacement for a lens mount of the type shown in FIG. 18, in which case the external geometry of the preferred embodiment can be produced to replicate that of the lens mounts of the type shown in FIG. 18. It is further understood that when such preferred embodiment is used as a replacement the invention must have means for inserting the protective window without altering the position of the lens within the mount so that the focal length is not changed. To use the preferred embodiment shown as a replacement for a lens mount of the type shown in FIG. 18, the distance between the flange on which the convex surface of the lens seats 230a, 230b and the flange 235a, 235b formed by top edge of lower section of the lens mount 227 is increased by the distance "Y" by making the male threaded end of such lower section 227 shorter by the distance (Y). Accordingly, sufficient room is provided (represented by the expression D=X+Y) to accommodate the lens 228, the protective window 236 and the spring 229 between the upper flange 230a, 230b and the lower flange 235a, 235b.

If a plano convex lens 228 is used in the lens assembly, the protective window 236 will be supported by the plano (flat) surface of the focusing lens as means to prevent the protective window 236 from breaking when exposed to high pressure from assist gas introduced through the holes 209 around the circumference of the work end of the internal cylindrical cavity of chamber 213 of the assembly. It is understood that a drilled protective window could be used in such preferred embodiment to permit assist gas to cool the focusing lens.

The protective window completely fills the work end of the cylindrical chamber 237 so that any spatter from the work will be blocked from coming into contact with the focusing lens.

Figure 20:
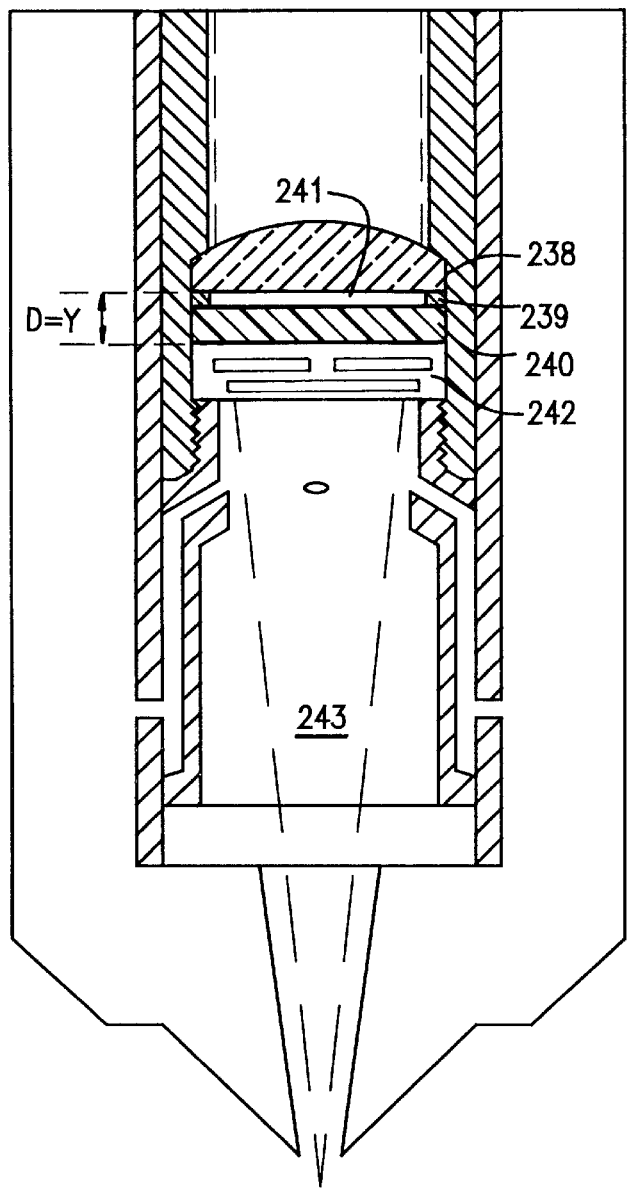
FIG. 20 shows a cross section of another embodiment of the present invention being a lens mount of the type shown in FIG. 19 with alternate means of employing a protective window.

FIG. 20 shows a cross section of another preferred embodiment of the present invention being a lens mounting assembly with same external geometry as the types of lens mounts shown in FIGS. 18 and 19. This preferred embodiment of the invention can be produced so that the focusing lens remains in the same position as it is in FIGS. 18 and 19 so as not to alter the focal point of the laser beam when the invention is used as a replacement lens mount for a lens mount of the type shown in FIG. 18. A spacer or flange 239 is located between the focusing lens 238 and a drilled protective window 240 in the assembly to form a cavity 241 between the lens 238 and the drilled protective window 240 into which pressurized assist gas can flow. The protective window 240 completely fills the work end of the cylindrical chamber 243 so that any spatter from the work will be blocked from coming into contact with the focusing lens 238. The drilling of the protective window 240 allows assist gas to pass into the cavity 241 created by the spacer or internal flange 239 which allows the pressure to equalize both in front of the window 240 and behind the window 240 in space within the cavity 241 and thereby creates a pressure neutral environment for the window 240. The cavity is formed by a spacer or internal flange 239 situated between the work end of the lens and the window.

It is understood that this embodiment of the invention may be used as a replacement for a pre-existing lens mount of the type shown in FIG. 18, in which event the spacer or flange 239 and the protective window are accommodated within the same space (represented by the expression D=Y) that accommodated the protective window 236 in FIG. 19 as the neutral pressure environment allows use of a thinner window, and the means of making the space in which these components seat is identical to the means employed in the case of the preferred embodiment of the invention shown in FIG. 19.

In this embodiment of the invention it is not necessary for the protective window to touch the lens to provide a means of preventing the window from breaking under the pressure applied by the assist gas, which makes this embodiment practical to use with focusing lenses that do not have a flat (plano) surfaces that will support the window, such a meniscus lens. It is also understood that the spacer or flange 239 could be eliminated between the lens 238 and the drilled protective window 240 if the work end surface of the lens is sufficiently concave to form a cavity in which the assist pressure can equalize.

Figure 21:
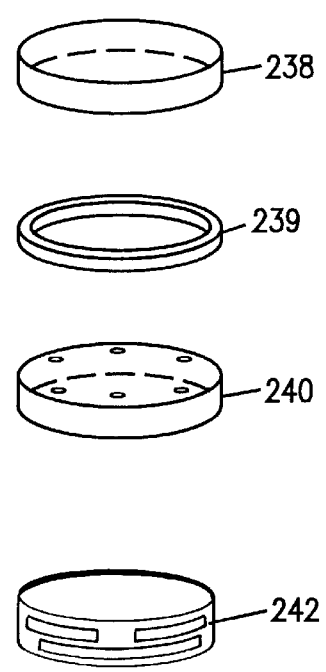
FIG. 21 shows a three dimensional exploded view of the internal component parts of the lens mount shown in FIG. 20.

FIG. 21 shows an exploded three dimensional view of the internal components of the preferred embodiment of the invention shown in FIG. 20, being a focusing lens 238, a spacer or flange 239, a drilled protective window 240 and a spring 242.

Figure 22:
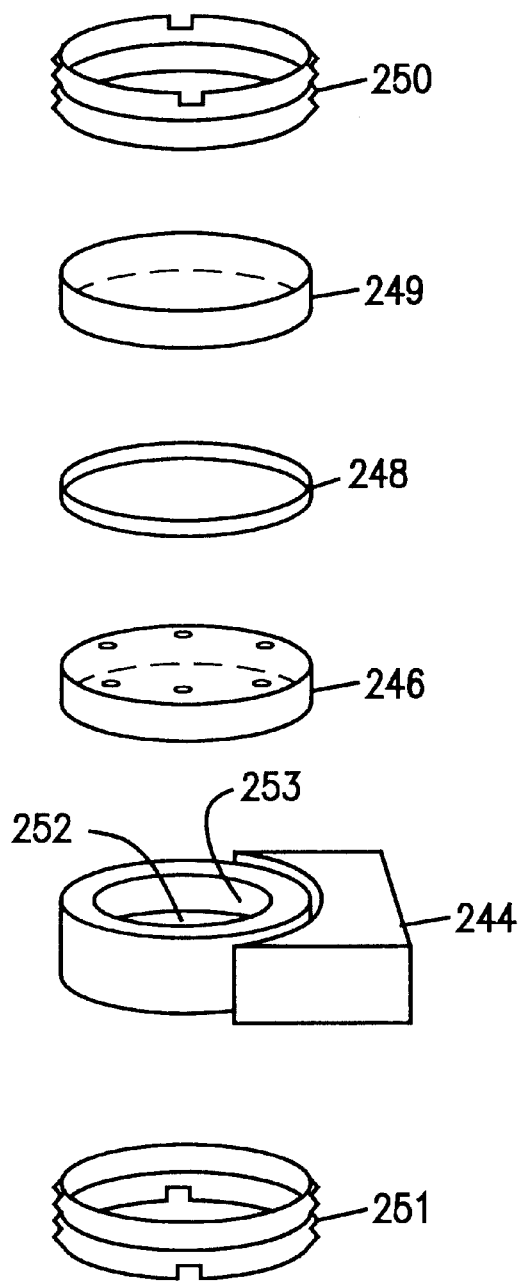
FIG. 22 shows a three dimensional exploded view of a preferred embodiment of the present invention wherein means are employed to accommodate a protective window.

FIG. 22 shows a three dimensional exploded view of another preferred embodiment of the invention in which a drilled protective window 246 is mounted in a drawer style lens mount assembly 244 which can be produced with the same external geometry as lens mounts manufactured by Laser Mechanisms, Inc. and others, which are used in several laser systems including the Cincinnati, Strippit and Lasercut brands, for the purpose of using the invention as a replacement for such types of lens mounts. In the preferred embodiment of the invention shown, a drilled protective window 246 is situated in front of the focusing lens 249 so that the protective window blocks the entire aperture of the cylindrical cavity 252 in which the focusing lens 249 is mounted. It is understood that if this preferred embodiment of the invention is to be used for a replacement of the drawer type mount made by Laser Mechanisms, Inc. or others, then it must slide into an aperture in the cutting head (not shown) of an existing laser system which is substantially the same size and shape as the lens mount and that it would require an impractical modification of the cutting head to accommodate a larger or different shape lens mount. In the preferred embodiment of the invention shown, the room required to accommodate the protective window 246 when the invention is used as a replacement lens mount in an existing laser system is created without altering the external geometry of the lens mount by such means as: (i) using a thinner focusing lens 249 than would normally be used in the OEM design, (ii) moving the lens back from the work 1 to 2 mm by means of shortening the retaining screw 250 by 1 to 2 mm, and (iii) moving the spacer 248 from a location at the front of the work end or the assembly to a position under the focusing lens 249 between the protective window 246 and the lens 249 or replacing such spacer 248 with a smaller spacer located between the protective window 246 and the lens 249 or eliminating the spacer in certain cases (see below).

The spacer 248 is placed between the focusing lens 249 and the drilled protective window 246 to form a cavity between the lens 249 and the drilled protective window 246 into which pressurized assist gas can flow. Drilling of the protective window 246 allows assist gas to pass into the cavity created by the spacer 248 or an optional internal flange (not shown) which allows the pressure to equalize both in front of and behind the window 246 and thereby creates a pressure neutral environment for the window 246. At the work end of the cylindrical cavity 252 of the lens mount is a flange 253 on which the protective window seats. In an alternative configuration of this embodiment of the invention, a work end retaining screw 251 can be substituted for the flange 253 to allow removal of the protective window without handling the focusing lens so as to prevent accidental damage to the focusing lens from mishandling.

In this embodiment of the invention it is not necessary for the protective window to touch the lens to provide a means of preventing the window from breaking under the pressure applied by the assist gas, which makes this embodiment practical to use with focusing lens that do not have a flat (plano) surface that will support the window, such as meniscus and diffractive lenses. It is understood, however, that in another embodiment of the invention (not shown) a protective window can be placed in contact with the flat surface of the plano convex lens to provide support for the protective window in the same manner as is shown in FIG. 14 and FIG. 19. It is also understood that the spacer or flange 248 could be eliminated between the lens 249 and the drilled protective window 246 if the work end surface of the lens is sufficiently concave to form a cavity in which the assist pressure can equalize.

Figure 23:
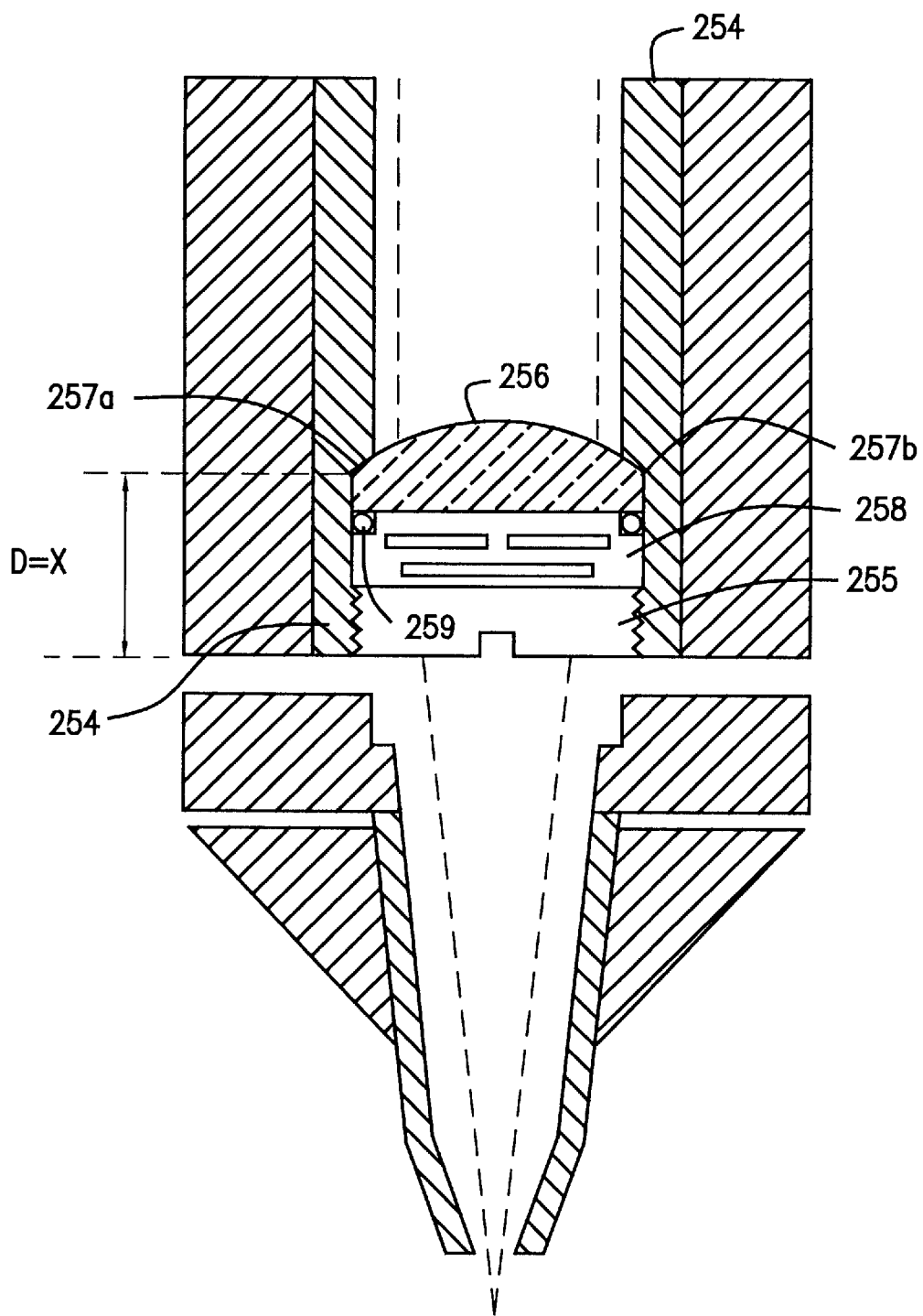
FIG. 23 shows a cross section of the component parts of a lens mount of the type typically used in certain $CO_2$ laser systems to mount the focusing lens.

FIG. 23 shows a cross section of a tubular lens mount typical of the type used by Bystronic and others for focusing lenses in laser cutting systems, which is similar to the tubular lens mount design shown in FIG. 18, except that in FIG. 18 the tube has two major components which screw together whereas the tubular design in FIG. 23 is a single internally threaded tube 254 into which a retaining screw 255 with a male thread is inserted to retain the focusing lens 256 in position within the tube 254. The tubes can be a varying lengths to accommodate various focal lengths and cutting head designs, it being understood that if the lens assembly is recessed in the tube the use of a spanner wrench on an extension handle is required to remove the optics by unscrewing the retaining screw 255. The focusing lens 256 is mounted inside the tube 254 with the lens 256 seated on a flange or shoulder in the tube 257a, 257b. The focusing lens 256 is held in place by an assembly consisting of a spring 258 with an "O" ring 259 mounted in a groove or channel within the spring at the interface of the spring with the lower (work end) surface of the lens 256, which assembly is secured within the tube by a retaining screw 255 with a male thread which screws into the tube 254. The space consumed by the assembly 255, 256, 258, 259 is represented by the expression D=X.

Figures 24, 25:
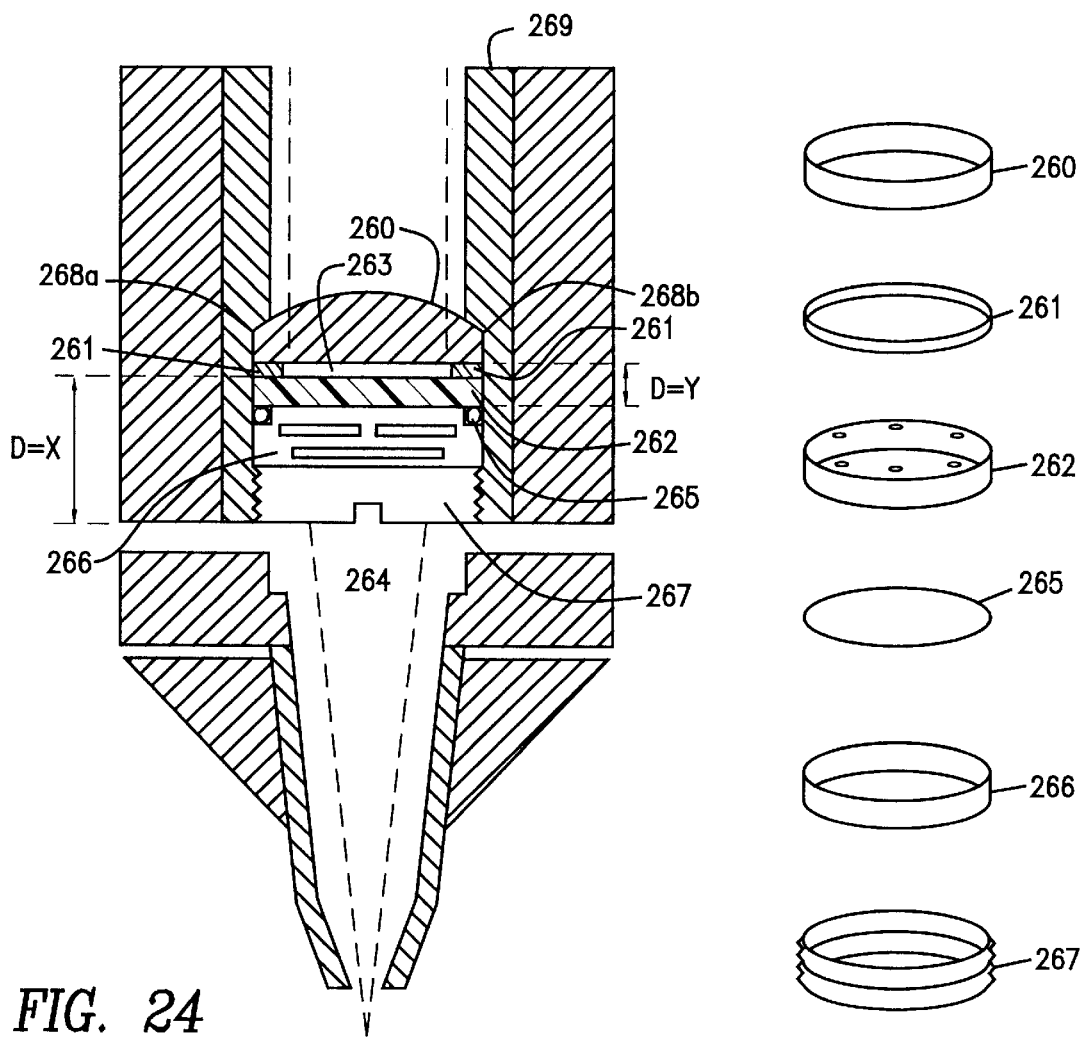
FIG. 24 shows a cross section of a preferred embodiment of the present invention being a lens mount of the type shown in FIG. 23 with means to employ a protective window.
FIG. 25 shows a three dimensional exploded view of the component parts of the internal lens mount shown in FIG. 24.

FIG. 24 shows a cross section of another preferred embodiment of the present invention being a lens mounting system which can be produced with the same external geometry as the type of lens mount shown in FIG. 23 for the purpose of using the invention as a replacement for lens mounts of such type. When this preferred embodiment of the invention is used as a replacement lens mount in an existing system, the focusing lens 260 is located in the same position as the focusing lens 256 in the lens mount shown FIG. 23 so as not to alter the focal point of the laser beam. A spacer or flange 261 is located between the focusing lens 260 and a drilled protective window 262 in the assembly to form a cavity 263 between the lens 260 and the drilled protective window 262 into which pressurized assist gas can flow. The protective window 262 completely fills the work end of the cylindrical chamber 264 so that any spatter from the work will be blocked from coming into contact with the focusing lens 260. The drilling of the protective window 262 allows assist gas to pass into the cavity 263 created by the spacer or flange 261 which allows the pressure to equalize both in front of the window 262 and behind the window 262 in space within the cavity 263 and thereby creates a pressure neutral environment for the window 262. The cavity is formed by a spacer or flange 261 situated between the work end of the lens 260 and the window 262.

It is understood that this embodiment of the invention may be used as a replacement for a pre-existing lens mount of the type shown in FIG. 23, in which event the spacer or flange 261, protective window 262, lens 260, "O" ring 265, spring 266 and retaining screw 267 are accommodated within the same space (represented by the expression D=X) that accommodates the lens 256, "O" ring 259, spring 258, and retaining screw 255 in the type of lens mount shown in FIG. 23. The additional space taken up by the protective window 262 and the spacer or flange 261 used in this preferred embodiment of the invention (represented by the expression D=Y) is made available by using a smaller spring 266 and retaining screw 267 than is used in OEM versions of lens mounts of the type shown in FIG. 23. The assembly consisting of the lens 260, spacer 261, protective window 262, "O" ring 265 and spring 266 is held in place by a retaining screw 267 which presses the lens 260 against a shoulder or flange 268a, 268b that forms a part of the tube 269 containing the assembly within the cutting head 270.

In this embodiment of the invention is not necessary for the protective window to touch the lens to provide a means of preventing the window from breaking under the pressure applied by the assist gas, which makes this embodiment practical to use with focusing lenses that do not have a flat (plano) surface that will support the window, such as meniscus and diffractive lenses. It is understood, however, that in another embodiment of the invention (not shown) a protective window can be placed in contact with the flat surface of a plano convex lens to provide support for the protective window in the same manner as is shown in FIG. 14 and FIG. 19. It is also understood that the spacer or flange 248 could be eliminated between the lens 249 and the drilled protective window 246 if the work end surface of the lens is sufficiently concave to form a cavity in which the assist gas pressure can equalize.

FIG. 25 shows an exploded three dimensional view of the internal components of the preferred embodiment of the invention shown in FIG. 24, being a focusing lens 260, spacer or flange 261, drilled protective window 262, "O" ring 265, spring 266 and retaining screw 267.

Figure 26:
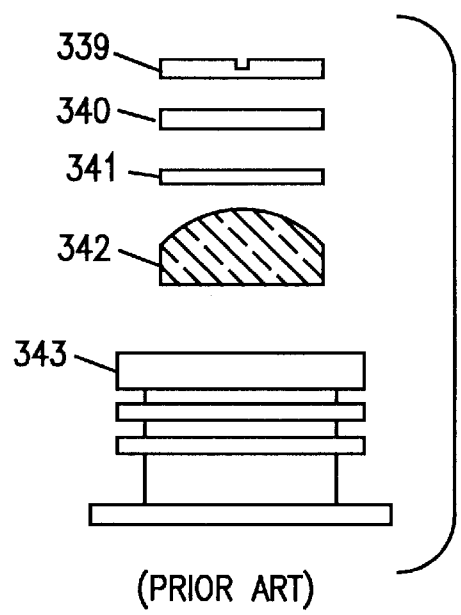
FIG. 26 is an exploded view of a lens mount for mounting a plano convex lens in a $CO_2$ laser in accordance with the present invention.

FIG. 26 shows an exploded view of a type of lens mount used to mount a plano convex lens in a $CO_2$ laser which comprises a hollow cylindrical assembly 343 with an opening at each end which contains a focusing lens 342 held in place by one or more components such as a retaining screw 339, a spring or other holder 340 and an "O" ring so that the plano surface of the lens is at the work end of the assembly.

Figure 27:
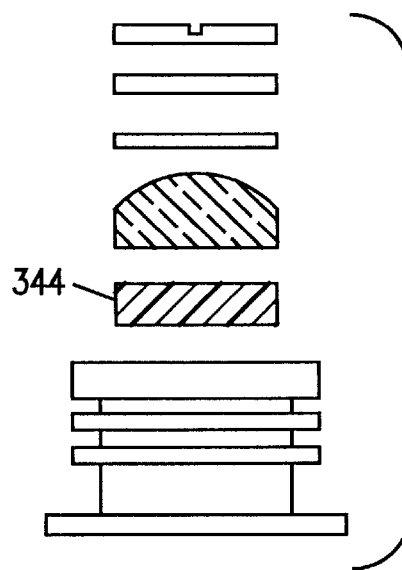
FIG. 27 is an exploded view of the lens mount shown in FIG. 26 having a protective window held in place with the same components used to hold the focusing lens in place.

FIG. 27 shows an exploded view of the lens mount shown in FIG. 26 with the addition of a protective window or barrier which is held in place by the same components as hold the focusing lens.

Figure 28:
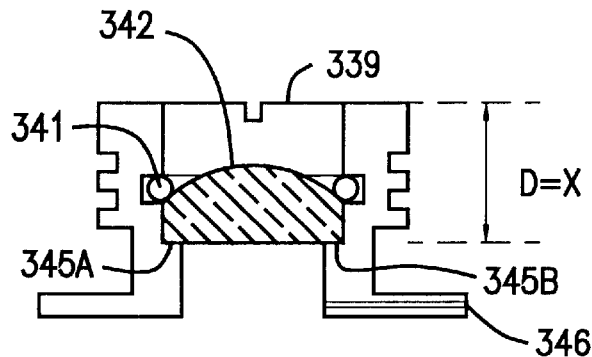
FIG. 28 shows a cross section of a lens mount of the type shown in FIG. 26.

FIG. 28 shows a cross section of the assembly shown in FIG. 26 in which the focusing lens 342 is seated on a flange 345A, 345B on the work end of the assembly in such a position that gas under pressure may be admitted through an opening 346 and blown against the optic. The distance between the flange 345A, 345B and the top of the retaining assembly is x.

Figure 29:
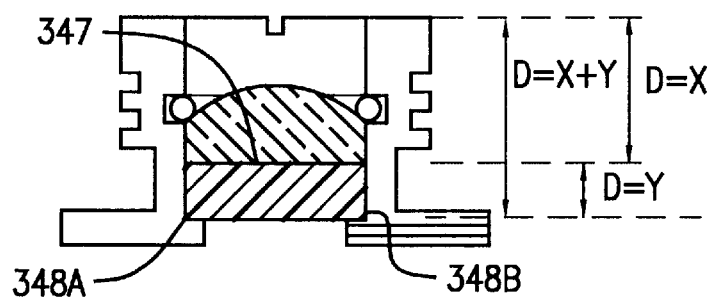
FIG. 29 shows a cross section of a lens mount of the type shown in FIG. 26 in which a protective barrier or window has been added and the mount has been modified.

FIG. 29 shows a cross section of the assembly shown in FIG. 26 in which a protective window 347 has been added in front of the focusing lens 342 by means of moving the flange 348A, 348B so that the distance between the flange and the top of the assembly is x+y where y equals the thickness of the protective window.

Figure 30:
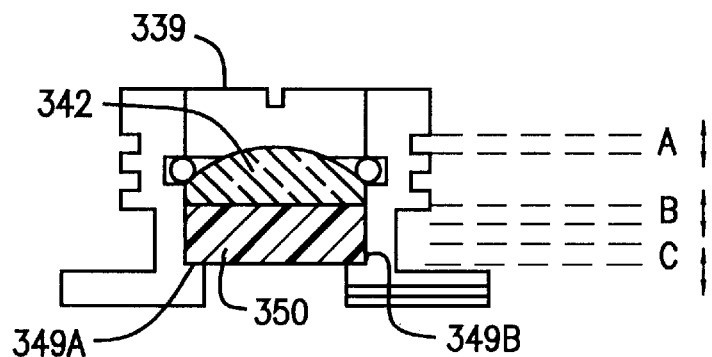
FIG. 30 shows a cross section of a lens mount of the type shown in FIG. 26 in which a protective window has been added and the mount is modified by a different means.

FIG. 30 shows a cross section of a lens mounting assembly of the type shown in FIG. 26 in which a protective window 350 has been added in front of the focusing lens by means of moving the flange 349A, 349B downward towards the work end by distance "C", decreasing the thickness of the focusing lens by distance "B" and decreasing the thickness of the retaining screw by distance "A". The thickness of protective window 350 is equal to A+B+C.

Figure 31:
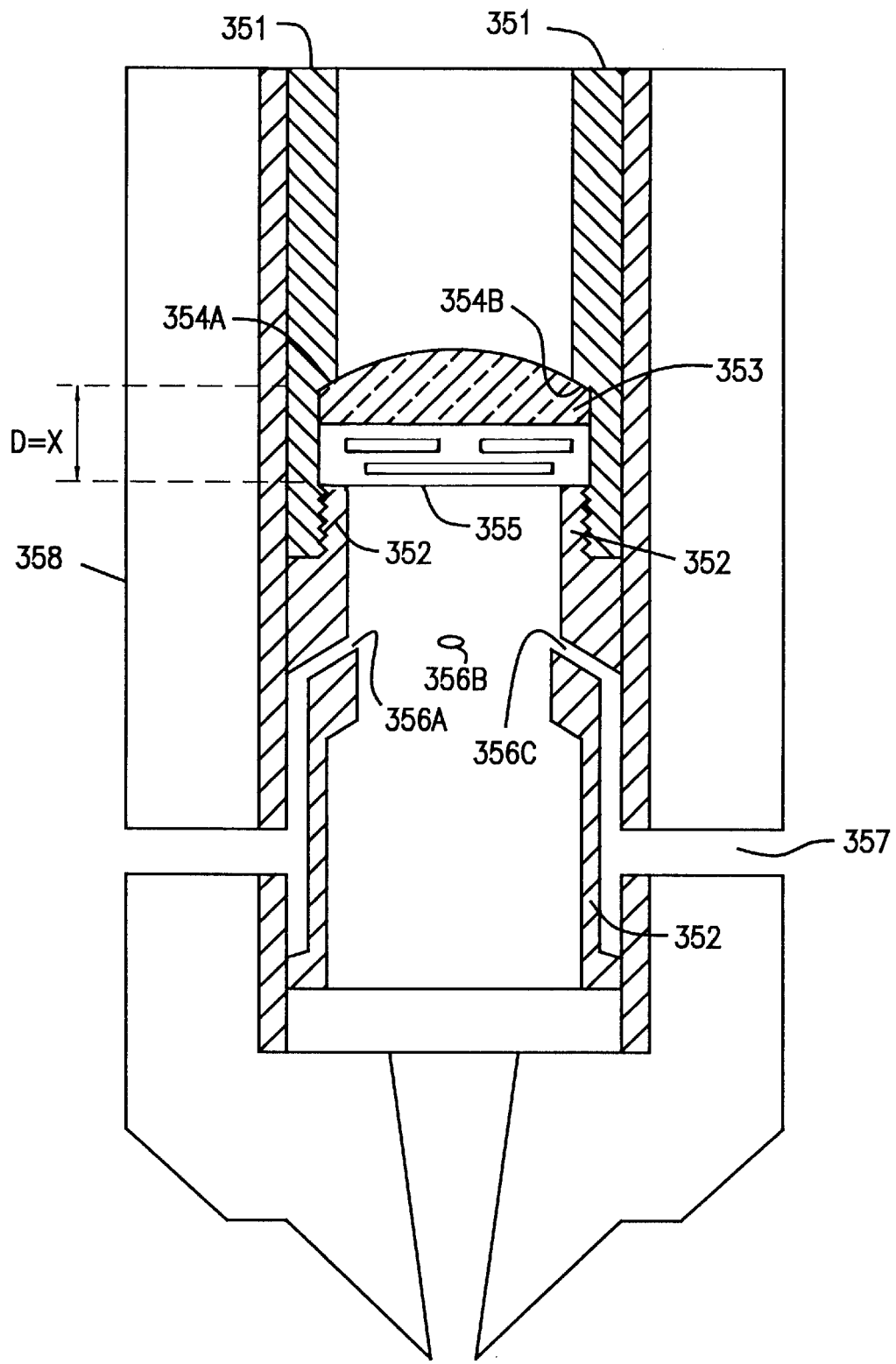
FIG. 31 shows a cross section of another type of mount typically used to mount a plano convex focusing lens in an industrial $CO_2$ laser.

FIG. 31 shows another type of lens mount used to mount a plano convex lens in a $CO_2$ laser which comprises two hollow cylindrical sections 351, 352 with an opening at each end between which sections the radiused surface of the focusing lens 353 is compressed against a flange 354A, 354B in the upper section 352 of the assembly by means of a spring or other retaining assembly 355 upon which pressure is applied by the screwing the male thread of the work end section 352 of the assembly into the female thread of the upper section 351 of the assembly. Gas under pressure is admitted into the mounting assembly through holes 356A, 356B, 356C in the mount and in the side wall 357 of the cutting head 358 in which the assembly is mounted. The distance between the top of the work end section 352 to the flange 354A, 354B located in the top section 351 is represented by x.

Figure 32:
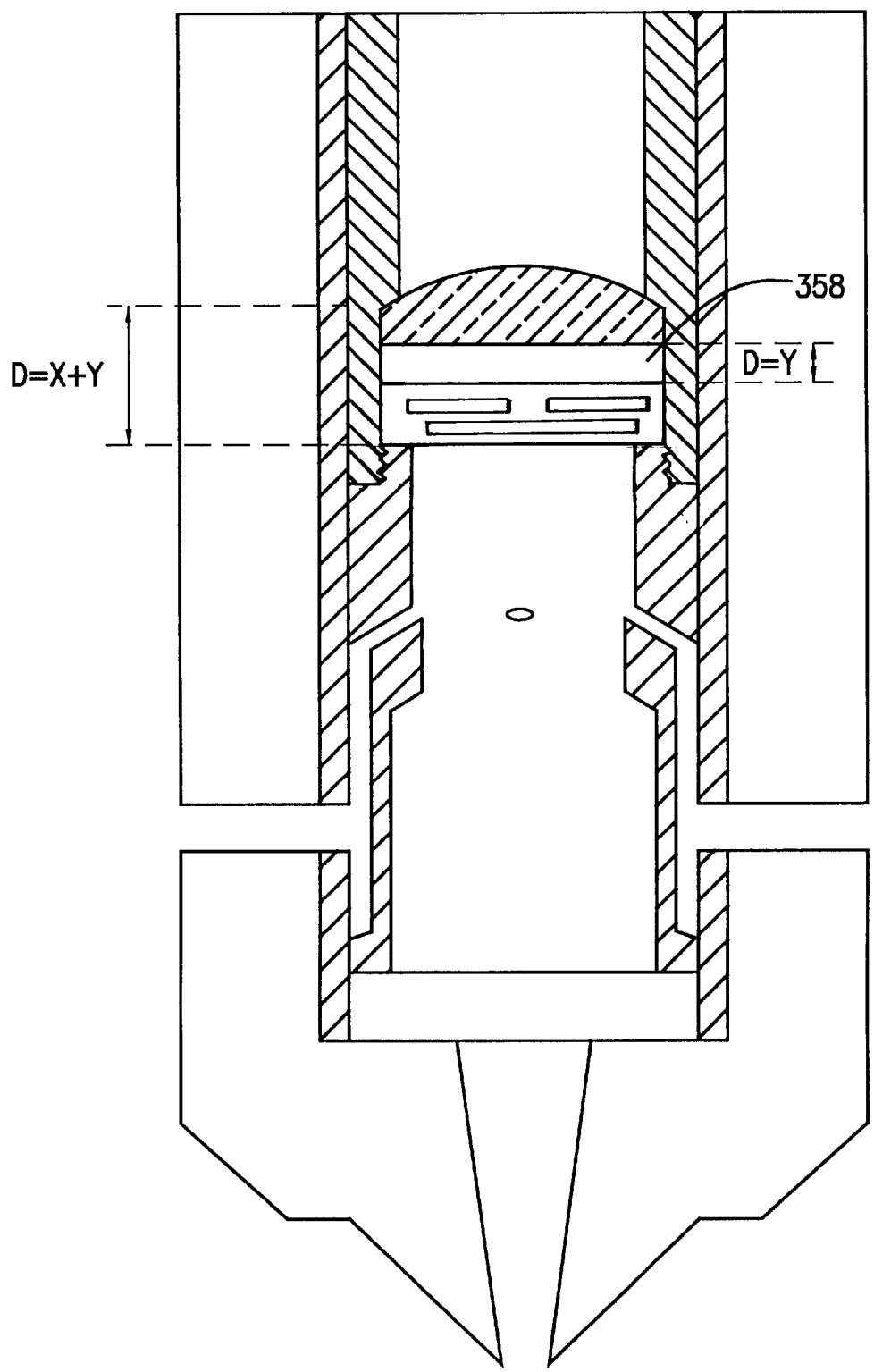
FIG. 32 shows a lens mount of the type shown in FIG. 31 which a protective window has been added.

FIG. 32 shows the same type of lens mount as is shown in FIG. 31, but with the addition of a protective barrier or window 358 which has been accommodated in a position parallel to and in contact with the plano surface of the focusing lens by decreasing the overall length of the work end section of the assembly 352 by a distance equal to the thickness (x) of the protective window or barrier such that the distance between the flange 354A, 354B and the top of the work end section 352 of the assembly is increased to x+y.

Figure 33:
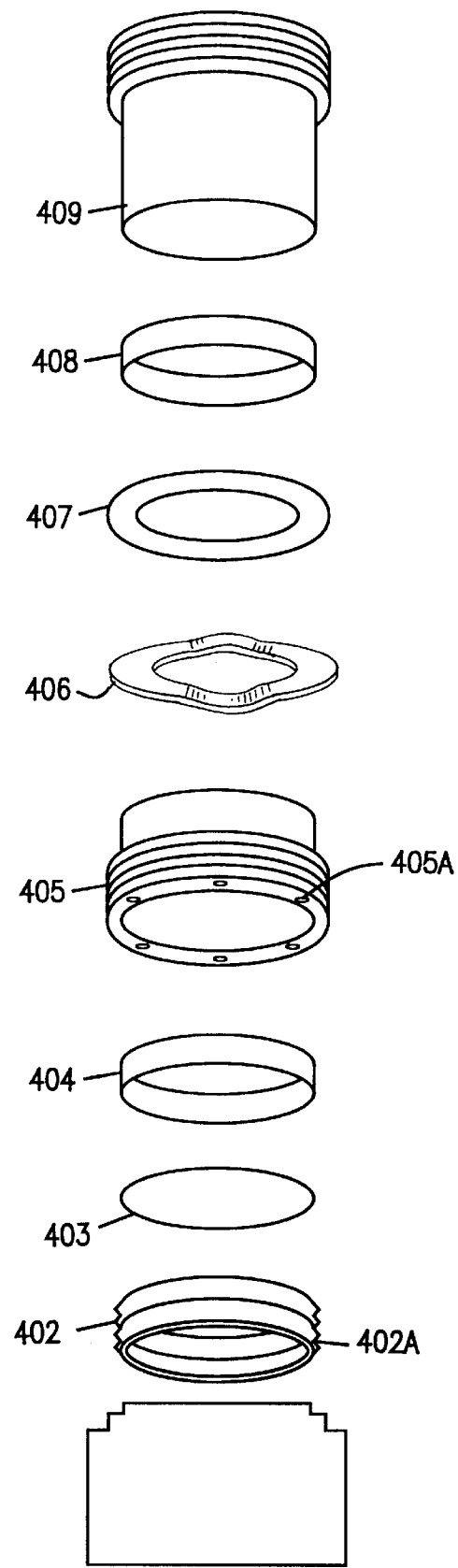
FIG. 33 is an exploded view of another embodiment of a lens mount assembly in accordance with the present invention.
Figure 34:
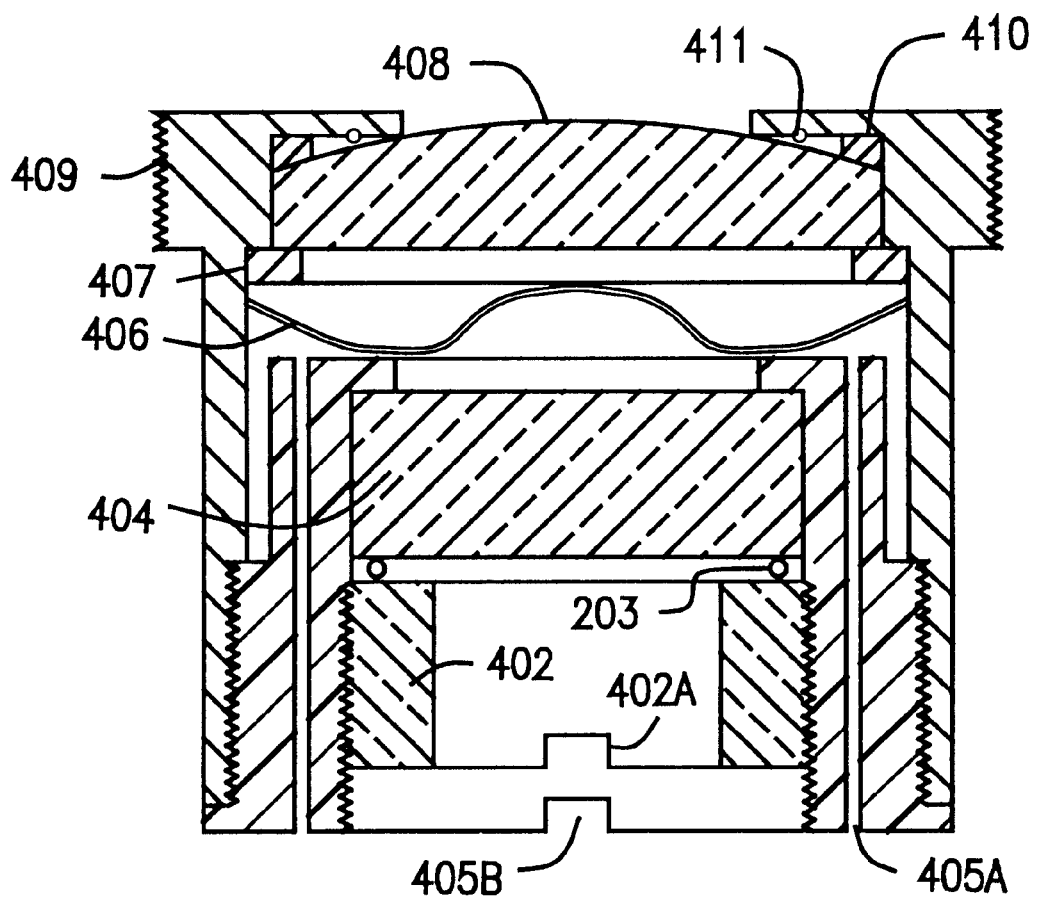
FIG. 34 is a side view of the lens mount assembly of FIG. 33 including a protective window.

Referring to FIGS. 33 and 34, the lens mount is an adapter to a Mazak lens mount 409 in which the focusing lens 408 is compressed against a flange 411 by means of spring 410. The adapter is in the form of two nesting retaining screws 402, 405 respective holes 402A and 405A which replace the retaining screw used by the original equipment manufacturer (OEM). The protective window 404 is inserted from the work end of the lens mount and it sits inside of the larger retaining screw 405 on a flange located at the laser end of the retaining screw. If handled properly, the protective window 404 can be removed and a replacement can be installed without disturbing the focusing lens 408, which limits the amount of refocusing that is required when the protective window 404 is changed.

The protective window 404 is held in place by an inner retaining screw 402 that nests inside of the larger outer retaining screw 405. Between the protective window 404 and the retaining screw is a lose "O" ring 403 which allows the window to expand when heated and cushions the optic when pressure is applied. The outside retaining screw 405 is tightened with firm pressure to hold the focusing lens in place. The rest of the components are then installed.

The holes 405A in the lens mount allow assist gas pressure to bypass the protective window 404. The wave spring 406 must be situated as shown to allow the assist gas to equalize in front of and behind the protective window.

What is claimed is:

1. A protective window assembly adapted to be inserted into a cutting head of a laser beam generating or delivering device comprising:
   a) a protective window positioned within a cavity, said cavity adapted to contain a focusing lens assembly of said device and a pressurized gas, said protective window separating the cavity into a first region lying between the focusing lens assembly and the protective window and a second region lying between the protective window and an exit from the cutting head for the laser beam;
   b) securing means for securing the protective window within the cavity; and
   c) gas pressure equalization means for substantially equalizing gas pressure within said first and second regions so that a pressure differential between said first and second regions is insufficient to rupture said protective window.

2. The protective window assembly of claim 1, wherein the pressure equalizing means comprises at least one aperture in the device to enable gas to pass around the protective window from one of said regions to the other.

3. The protective window assembly of claim 1, wherein the pressure equalizing means comprises at least one aperture in the protective window to enable gas to pass through the protective window from one of said regions to the other.

4. The protective window assembly of claim 1 wherein the protective window is made from an alkali metal halide.

5. The protective window of claim 4 wherein the alkali metal halide is selected from the group consisting of potassium chloride and sodium chloride.

6. The protective window assembly of claim 1 further comprising a housing defining said cavity.

7. The protective window assembly of claim 1 wherein the securing means is selected from the group consisting of at least one set screw, gasket, flange, thread and groove assembly, and O-ring.

8. A combination of a focusing lens assembly and protective window assembly adapted to be inserted into a cutting head of a laser beam generating or delivering device in which the cutting head employs a pressurized gas comprising:
   a) a focusing lens positioned within a housing defining a cavity of said cutting head;
   b) first securing means for securing the focusing lens within the cavity;
   c) a protective window positioned within said cavity and spaced apart from said focusing lens to separate the cavity into a first region lying between the focusing lens assembly and the protective window and a second region lying between the protective window and an exit from the cutting head for the laser beam;
   d) second security means for securing the protective window within the cavity; and
   e) gas pressure equalization means for substantially equalizing gas pressure within said first and second regions so that a pressure differential between said first and second regions is insufficient to rupture said protective window.

9. The combination of claim 8 further comprising third securing means for securing the protective window assembly to the focusing lens assembly.

10. The protective window assembly of claim 8, wherein the pressure equalizing means comprises at least one aperture to enable gas to pass around the protective window from one of said regions to the other.

11. The protective window assembly of claim 8 wherein the pressure equalizing means comprises at least one aperture in the protective window to enable gas to pass through the protective window from one of said regions to the other.

12. The protective window assembly of claim 8 wherein the protective window is made from an alkali metal halide.

13. The protective window assembly of claim 12 wherein the alkali metal halide is selected from the group consisting of potassium chloride and sodium chloride.

14. The combination of claim 8 wherein each of said first, second and third securing means is independently selected from the group consisting of at least one set screw, gasket, flange, thread and groove assembly, and O-ring.

15. A method of protecting a focusing lens assembly for a laser beam generating or delivering device comprising:
   a) inserting a protective window within a cavity of a cutting head of said device in a position to separate the cavity into a first region lying between the focusing lens assembly and the protective window and a second region lying between the protective window and an exit from the cutting head for the laser beam; and
   b) allowing a pressurized gas employed during operation of the device to pass from one of said regions to the other so that a pressure differential between said first and second regions is insufficient to rupture the protective window.

* * * * *